United States Patent
Mochizuki et al.

(10) Patent No.: US 11,356,644 B2
(45) Date of Patent: Jun. 7, 2022

(54) ILLUMINATOR AND PROJECTOR

(71) Applicant: SONY CORPORATION, Tokyo (JP)

(72) Inventors: Takahiro Mochizuki, Kanagawa (JP); Masa Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 16/630,081

(22) PCT Filed: Jun. 18, 2018

(86) PCT No.: PCT/JP2018/023093
§ 371 (c)(1),
(2) Date: Jan. 10, 2020

(87) PCT Pub. No.: WO2019/017128
PCT Pub. Date: Jan. 24, 2019

(65) Prior Publication Data
US 2020/0169707 A1  May 28, 2020

(30) Foreign Application Priority Data
Jul. 19, 2017 (JP) .............................. JP2017-139991

(51) Int. Cl.
*H04N 9/31* (2006.01)
*G02B 27/42* (2006.01)
*G03B 21/20* (2006.01)

(52) U.S. Cl.
CPC ........... *H04N 9/3155* (2013.01); *G02B 27/42* (2013.01); *G03B 21/2033* (2013.01);
(Continued)

(58) Field of Classification Search
CPC ...... G03B 21/00–64; H04N 9/31–3197; G02B 27/01–0189; G02B 5/00–32;
(Continued)

(56) References Cited

U.S. PATENT DOCUMENTS

| 2004/0263791 A1* | 12/2004 | Chen | G02B 27/0994 |
|---|---|---|---|
| | | | 353/31 |
| 2007/0046901 A1* | 3/2007 | Kuno | H04N 9/3194 |
| | | | 353/69 |

(Continued)

FOREIGN PATENT DOCUMENTS

| JP | H04-293075 | 10/1992 |
|---|---|---|
| JP | H06-194509 | 7/1994 |

(Continued)

OTHER PUBLICATIONS

International Search Report prepared by the Japan Patent Office dated Sep. 4, 2018, for International Application No. PCT/JP2018/023093.

*Primary Examiner* — Michelle M Iacoletti
*Assistant Examiner* — Christopher A Lamb, II
(74) *Attorney, Agent, or Firm* — Sheridan Ross P.C.

(57) ABSTRACT

An illuminator of the present disclosure includes a light source unit that emits at least one colored light, and emits, for each of the pieces of colored light, light having a plurality of peak wavelengths different from each other, and a diffraction device that includes a plurality of divided areas, and displays, in each of the divided areas, a diffraction pattern that is optimized at a corresponding peak wavelength out of each of the peak wavelengths. The plurality of divided areas allows the light of the plurality of peak wavelengths to enter the plurality of divided areas individually for each of the pieces of colored light.

20 Claims, 17 Drawing Sheets

(52) U.S. Cl.
    CPC ......... *H04N 9/3158* (2013.01); *H04N 9/3161*
                            (2013.01); *H04N 9/3164* (2013.01)

(58) Field of Classification Search
    CPC ...... G02B 27/00–648; G02B 2027/0105–0198
    See application file for complete search history.

(56) References Cited

U.S. PATENT DOCUMENTS

| | | | |
|---|---|---|---|
| 2009/0109349 A1* | 4/2009 | Kanai | ................. G03H 1/2294 |
| | | | 348/744 |
| 2009/0180082 A1 | 7/2009 | Oakley | |
| 2010/0002196 A1* | 1/2010 | Lu | ........................ G03B 21/005 |
| | | | 353/31 |
| 2012/0013855 A1 | 1/2012 | Lescure et al. | |
| 2013/0170006 A1 | 7/2013 | Kurashige et al. | |
| 2016/0266545 A1* | 9/2016 | Kurashige | ................ G03H 1/22 |
| 2016/0349526 A1 | 12/2016 | Kurashige et al. | |

FOREIGN PATENT DOCUMENTS

| | | |
|---|---|---|
| JP | H08-021909 | 1/1996 |
| JP | 2008-089686 | 4/2008 |
| JP | 2008-292725 | 4/2008 |
| JP | 2012-230360 | 11/2012 |
| JP | 2016-051018 | 4/2016 |
| WO | WO 2012/033175 | 3/2012 |

* cited by examiner

ILLUMINATOR AND PROJECTOR

CROSS REFERENCE TO RELATED APPLICATIONS

This application is a national stage application under 35 U.S.C. 371 and claims the benefit of PCT Application No. PCT/JP2018/023093 having an international filing date of 18 Jun. 2018, which designated the United States, which PCT application claimed the benefit of Japanese Patent Application No. 2017-139991 filed 19 Jul. 2017, the entire disclosures of each of which are incorporated herein by reference.

TECHNICAL FIELD

The present disclosure relates to an illuminator that uses a diffraction device so as to generate illumination light and a projector that projects a picture on the basis of the illumination light.

BACKGROUND ART

A projector is known that performs intensity modulation on illumination light from an illuminator by a light intensity modulation device such as a liquid crystal panel so as to generate a projection image. There is also a technique where in a projector, a diffraction device is used in an illuminator so as to generate an illumination image pattern whose phase is modulated on the basis of an image and where the illumination image pattern is utilized as illumination light for a light intensity modulation device.

CITATION LIST

Patent Literature

PTL 1: Japanese Unexamined Patent Application Publication No. 2008-292725
PTL 2: Japanese Unexamined Patent Application Publication No. 2008-89686
PTL 3: Japanese Unexamined Patent Application Publication No. H4-293075

SUMMARY OF THE INVENTION

In a color projector, as light sources serving as the source of illumination light, for example, a plurality of laser light sources is used for respective colors. For example, in a case where a plurality of laser light sources is used, even the laser light sources of the same color may have different peak wavelengths depending on individual differences or the like.

It is desirable to provide an illuminator and a projector which use light having a plurality of peak wavelengths so as to be able to obtain a clear illumination image.

An illuminator according to an embodiment of the present disclosure includes: a light source unit that emits at least one colored light, and emits, for each of the pieces of colored light, light having a plurality of peak wavelengths different from each other; and a diffraction device that includes a plurality of divided areas, and displays, in each of the divided areas, a diffraction pattern that is optimized at a corresponding peak wavelength out of each of the peak wavelengths, in which the plurality of divided areas allows the light of the plurality of peak wavelengths to enter the plurality of divided areas individually for each of the pieces of colored light.

A projector according to an embodiment of the present disclosure includes: an illuminator; a light intensity modulation device that performs intensity modulation on illumination light from the illuminator to generate a projection image; and a projection optical system that projects, on a projection surface, the projection image generated by the light intensity modulation device. The illuminator includes a light source unit that emits at least one colored light, and emits, for each of the pieces of colored light, light having a plurality of peak wavelengths different from each other, and a diffraction device that includes a plurality of divided areas, and displays, in each of the divided areas, a diffraction pattern that is optimized at a corresponding peak wavelength out of each of the peak wavelengths, in which the plurality of divided areas allows the light of the plurality of peak wavelengths to enter the plurality of divided areas individually for each of the pieces of colored light.

In the illuminator or the projector according to the embodiment of the present disclosure, the diffraction device includes the plurality of divided areas, and displays, in each of the divided areas, the diffraction pattern that is optimized at a corresponding peak wavelength out of each of the peak wavelengths. The plurality of divided areas allows the light of the plurality of peak wavelengths to enter the plurality of divided areas individually for each of the pieces of colored light.

In the illuminator or the projector according to the embodiment of the present disclosure, the diffraction device includes the plurality of divided areas, and displays, in each of the divided areas, the diffraction pattern that is optimized at a corresponding peak wavelength out of each of the peak wavelengths. The plurality of divided areas allows the light of the plurality of peak wavelengths to enter the plurality of divided areas individually for each of the pieces of colored light. Hence, it is possible to obtain a clear illumination image by use of the light having the plurality of peak wavelengths.

It is to be noted that effects of the disclosure are not necessarily limited to the effects described above, and may include any of effects that are described herein.

MODES FOR CARRYING OUT THE INVENTION

Figure 1:
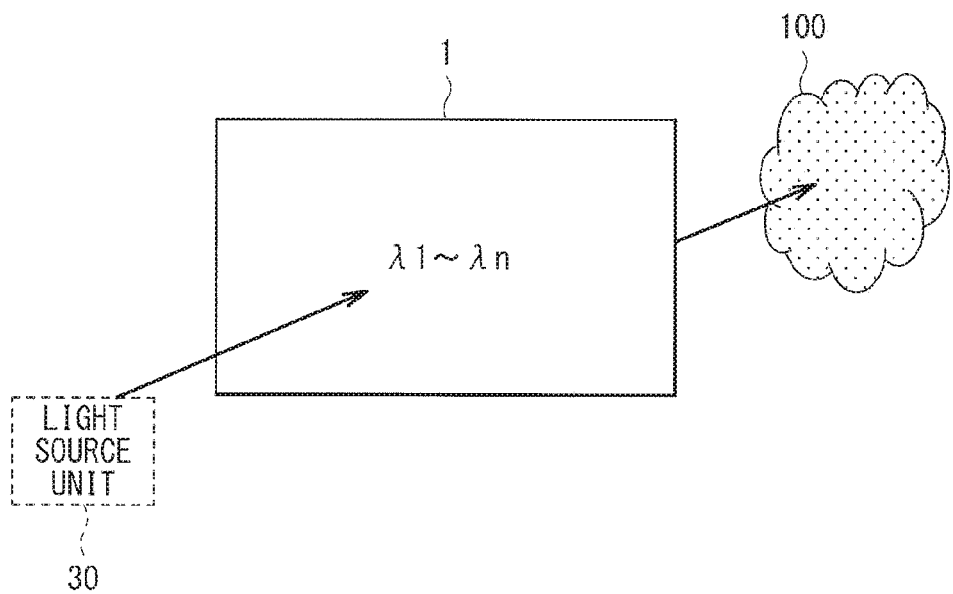
FIG. 1 is an illustrative diagram that illustrates an outline of an illuminator according to a comparative example.

Embodiments of the present disclosure will be described in detail below with reference to drawings. It is to be noted that the description is made in the following order.

0. Comparative Example (FIG. 1)
1. First Embodiment (FIGS. 2 to 21)
    1.1 Outline of Illuminator
    1.2 Configuration Example of Light Separation Optical System
    1.3 Basic Configuration Example of Projector
    1.4 Method of Calculating Diffraction Pattern at Each Peak Wavelength
    1.5 Configuration Example of Full-Color Projector
    1.6 Effects
2. Second Embodiment (FIGS. 22 to 24)
    2.1 Configuration and Operation
    2.2 Effects
3. Other Embodiments

0. COMPARATIVE EXAMPLE

As a general projector, a projector is known that applies uniform illumination light to a spatial light intensity modulation device and performs light intensity modulation so as to generate an image and that projects, through a projection lens, the generated image on a screen. As the spatial light intensity modulation device, a liquid crystal display panel, DMD (Digital Micro-mirror Device) or the like is used.

However, in particular, in an image in which the entire screen is dark, the illumination light is interrupted by the spatial light intensity modulation device so as to be used, and thus the efficiency of utilization of the light is lowered, Although in a liquid crystal display panel or the like, light should naturally be interrupted, a small amount of light leaks, and thus contrast is lowered.

By contrast, PTL 1 (Japanese Unexamined Patent Application Publication No. 2008-292725) and PTL 2 (Japanese Unexamined Patent Application Publication No. 2008-89686) disclose a technique in which a spatial optical phase modulation device such as SLM (Spatial Light Modulator) is utilized as a diffraction device so as to generate illumination light and in which thus a portion of light applied to a pixel region of low luminance is distributed to a high-luminance region.

These literatures disclose a technique in which illumination light of three primary colors (red, green, and blue) necessary for the color display of a projector is generated by diffraction devices that are different for the respective colors. On the other hand, a method of generating illumination light of three primary colors necessary for color display by one diffraction device is considered from the details of the disclosure of PTL 3 (Japanese Unexamined Patent Application Publication No. H4-293075).

However, in the techniques disclosed in PTLs 1 to 3, in a case where a light source used for each of the colors basically has one peak wavelength as with a single laser light source, and where the light source does not have a narrow wavelength width, the positions in which the illumination light is generated and the sizes thereof differ depending on a wavelength displacement from the design wavelength of a diffraction pattern, with the result that an illumination image is blurred. Moreover, in order for a clear illumination image to be generated, there is a certain degree of restriction on the wavelength width, and consequently, speckles specific to laser are generated. On the other hand, in a case where a plurality of laser light sources is used, even the laser light sources of the same color may have different peak wavelengths depending on individual differences or the like.

Hence, it is desirable to develop a technique in which even when light having a plurality of peak wavelengths is used, it is possible to obtain a clear illumination image.

FIG. 1 schematically illustrates an illuminator according to a comparative example.

The illuminator includes a light source unit 30 and a diffraction device 1.

The diffraction device 1 displays a diffraction pattern that performs phase modulation on light emitted from the light source unit 30. In this way, an illumination image 100 corresponding to the diffraction pattern displayed on the diffraction device 1 is formed.

Here, a case is considered where the light source unit 30 emits light having a plurality of peak wavelengths ($\lambda 1$, $\lambda 2$, ... $\lambda n$) that are different from each other. In this case, the light source unit 30 includes, for example, a plurality of light sources that emits the light having the peak wavelengths that are different from each other. The light source unit 30 may emit, from a single light source, light having a plurality of peak wavelengths.

In a case where as illustrated in FIG. 1, the light having the plurality of peak wavelengths is applied to the diffraction device 1 on which the single diffraction pattern is displayed so as to generate illumination light, it is known that the size of the generated illumination image 100 (=the size of the illumination light) is changed depending on the wavelength of the light source as represented by a formula indicated below. The size of the illumination image 100 differs at each of the wavelengths, and thus the blurring of the illumination light (illumination image 100) occurs. Although it is also possible to equalize the size of the illumination image 100 at different wavelengths, since in such a case, a distance from the diffraction device 1 to the illumination image 100 is changed, when a target surface serving as an illumination target is set at any one place, the blurring of the illumination image 100 occurs on the target surface.

$$D=f\lambda/p$$

(D: size of illumination image 100, f: distance from diffraction device 1 to illumination image 100, $\lambda$: wavelength, p: pixel pitch in diffraction device 1)

1. FIRST EMBODIMENT

[1.1 Outline of Illuminator]

Figure 2:
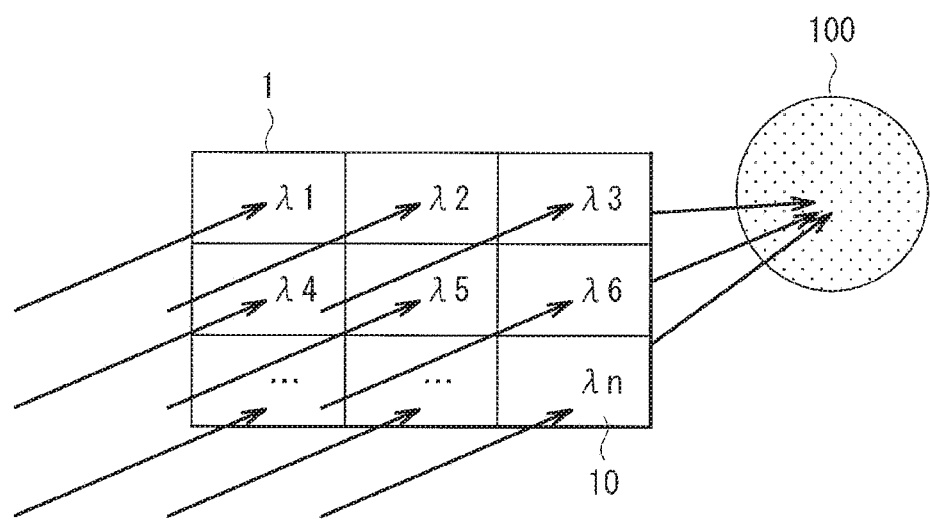
FIG. 2 is an illustrative diagram that illustrates an outline of an illuminator according to a first embodiment of the present disclosure.

FIG. 2 schematically illustrates an illuminator according to a first embodiment.

Although the illuminator according to the present embodiment includes, substantially as with the illuminator according to the comparative example, the light source unit 30 and the diffraction device 1, in the illuminator according to the present embodiment, as will be described below, the way of making light enter the diffraction device 1 and the method of displaying a diffraction pattern are different.

The light source unit 30 emits coherent light having a plurality of peak wavelengths ($\lambda 1$, $\lambda 2$, ... $\lambda n$) that are different from each other. The diffraction device 1 divides the display area of the diffraction device 1 on the basis of the number of peak wavelengths of the light from the light source unit 30, and displays, in the individual divided areas 10, a diffraction pattern that is optimized at a corresponding peak wavelength out of each of the peak wavelengths.

In the diffraction device 1, the diffraction pattern calculated under conditions suitable for the peak wavelengths of the applied coherent light is displayed in the individual divided areas 10 of the diffraction device 1. The light diffracted in the individual divided areas 10 is superimposed on a certain target surface so as to generate clear illumination light (illumination image 100). In the illumination light obtained by superimposing the light of the different peak wavelengths, it is also possible to reduce speckles specific to laser that are based on the number of wavelengths and the wavelength widths of the light of the individual peak wavelengths.

(Preferable Form of Divided Areas 10)

Figure 3:
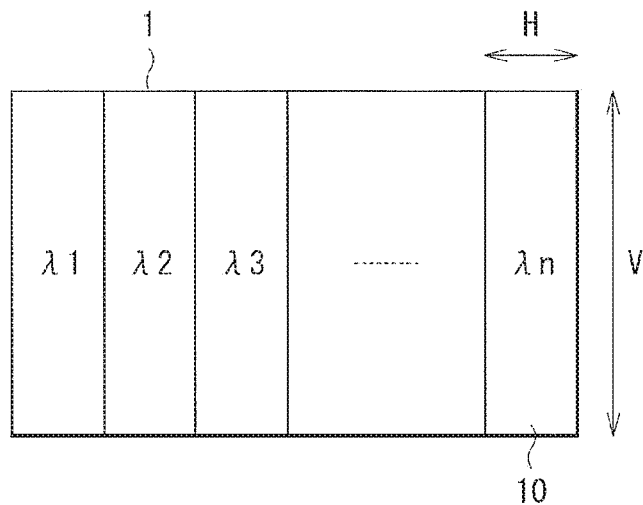
FIG. 3 is an illustrative diagram that illuminates a first example of the division pattern of a display area in a diffraction device.

FIG. 3 illustrates a first example of the division pattern of the display area in the diffraction device 1.

Figure 4:
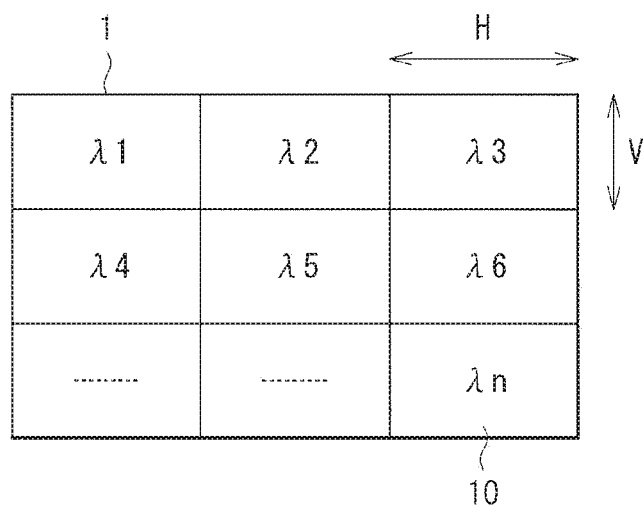
FIG. 4 is an illustrative diagram that illuminates a second example of the division pattern of the display area in the diffraction device.

FIG. 4 illustrates a second example of the division pattern of the display area in the diffraction device 1.

In a case where the display area of the diffraction device 1 is divided as described above on the basis of the number of peak wavelengths, each of the divided areas 10 desirably has such a shape as to decrease a difference between a length H in a horizontal direction and a length V in a vertical direction. As the difference between the length H in the horizontal direction and the length V in the vertical direction is increased, in each of the divided areas 10, a difference between a resolution in the horizontal direction and a resolution in the vertical direction is increased, with the result that the efficiency of generation of the illumination image 100 is lowered. For example, in a case where as illustrated in FIG. 3, the display area of the diffraction device 1 is divided in only any one of the horizontal direction and the vertical direction and where a plurality of divided areas 10 is aligned, in each of the divided areas 10, the difference between the length H in the horizontal direction and the length V in the vertical direction is increased. By contrast, in a case where as illustrated in FIG. 4, the display area of the diffraction device 1 is divided in two directions that are the horizontal direction and the vertical direction and where the plurality of divided areas 10 is aligned in a plurality of directions that are the horizontal direction and the vertical direction, in each of the divided areas 10, the difference between the length H in the horizontal direction and the length V in the vertical direction is decreased. In this way, in each of the divided areas 10, the difference between the resolution in the horizontal direction and the resolution in the vertical direction is decreased, and thus it is possible to enhance the efficiency of generation of the illumination image 100.

Figure 5:
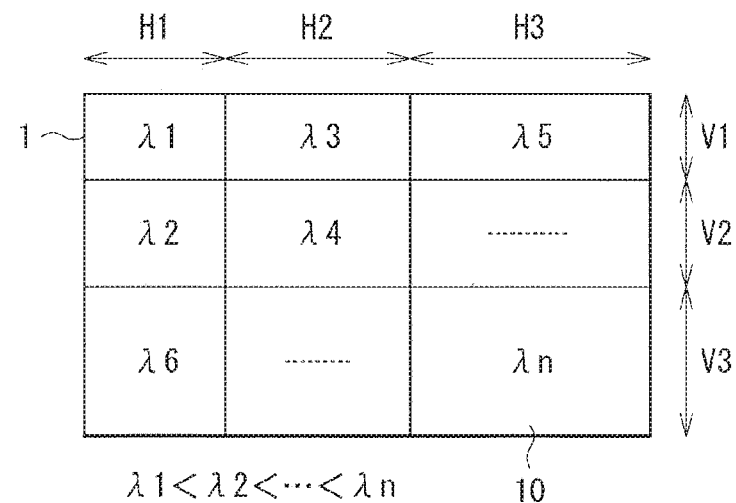
FIG. 5 is an illustrative diagram that illuminates a third example of the division pattern of the display area in the diffraction device.

FIG. 5 illustrates a third example of the division pattern of the display area in the diffraction device 1.

In a case where the areas of the plurality of divided areas 10 are set equal to each other, the size of the illumination image 100 generated differs at each of the peak wavelengths, and thus unevenness in the image caused by the difference of the wavelengths occurs, with the result that in particular, in a case where a small illumination image 100 is generated, a disadvantage may be encountered. Hence, it is desirable that for each of the pieces of colored light, the areas of the plurality of divided areas 10 be different from each other depending on the peak wavelengths of light that enters the divided areas 10. In this case, it is desirable that the area of each of the divided areas 10 be decreased as the peak wavelength of the entrance light is shortened. FIG. 5 illustrates an example of the division in a case where the magnitudes of the peak wavelengths satisfy a relationship of $\lambda 1 < \lambda 2 < ... < \lambda n$. FIG. 5 also illustrates an example where the length H in the horizontal direction is divided into a plurality of different lengths H1, H2, and H3, where the length V in the vertical direction is divided into a plurality of different lengths V1, V2, and V3, and where thus the areas of the plurality of divided areas 10 are made to differ from each other.

The division pattern of the display area described above is an example, and may be another division pattern. The shape of each of the divided areas 10 is not limited to a rectangular shape, and may be another shape.

[1.2 Configuration Example of Light Separation Optical System]

In a case where the light source unit 30 includes a plurality of light sources and where the peak wavelengths of light emitted by the individual light sources are different, it is relatively easy to spatially separate the light of the individual peak wavelengths emitted from the individual light sources and to illuminate the individual divided areas 10 in the diffraction device 1. However, when a single light source that emits light having a plurality of peak wavelengths is used as the light source unit 30, a means is necessary which spatially separates the light emitted from the single light source at each of the peak wavelengths such that the light of each of the peak wavelengths illuminates the corresponding divided area 10.

Figure 6:
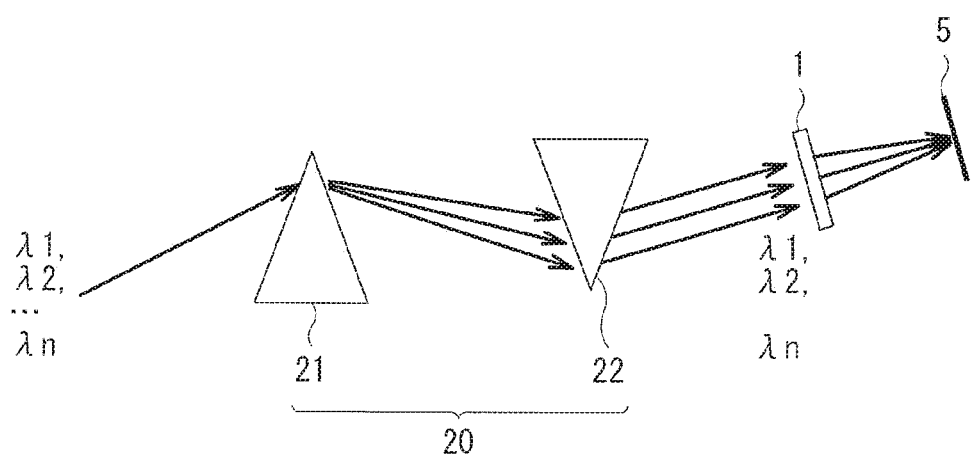
FIG. 6 is a configuration diagram that illustrates a first configuration example of a light separation optical system that spatially separates light emitted from a light source unit.

FIG. 6 schematically illustrates a first configuration example of the light separation optical system that spatially separates the light emitted from the light source unit 30.

As the first configuration example of the light separation optical system that spatially separates the light emitted from the light source unit 30, a prism pair 20 may be used that includes a first prism 21 and a second prism 22 as illustrated in FIG. 6. The first prism 21 and the second prism 22 are separated spatially and sufficiently so as to be disposed, and thus even in a case where the light source unit 30 emits light of individual peak wavelengths that are separated only about several nanometers apart, it is possible to spatially separate the light at each of the peak wavelengths.

Figure 7:
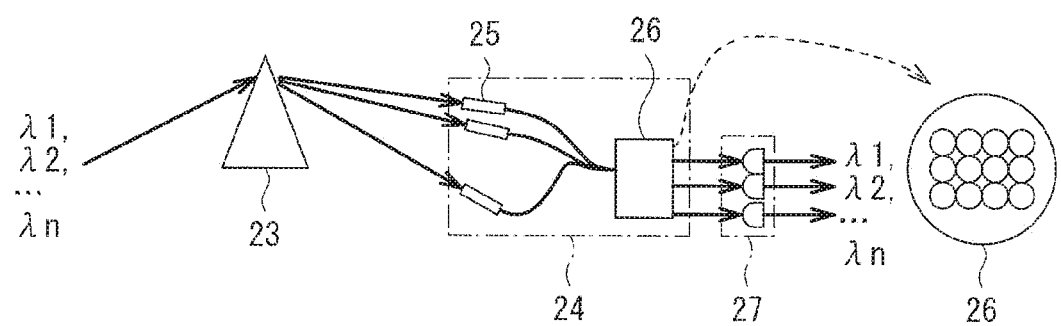
FIG. 7 is a configuration diagram that illustrates a second configuration example of the light separation optical system that spatially separates the light emitted from the light source unit.

FIG. 7 schematically illustrates a second configuration example of the light separation optical system that spatially separates the light emitted from the light source unit 30.

As the second configuration example of the light separation optical system, in a direction in which the light emitted from the light source unit 30 travels, a prism 23, a fiber bundle 24, and a collimator lens array 27 may be disposed.

The prism 23 separates the light emitted from the light source unit 30 into light of the individual peak wavelengths. The fiber bundle 24 is formed by bundling a plurality of optical fibers 25 that is individually provided for the light of the peak wavelengths, and the light of the peak wavelengths individually enters the optical fibers 25. The collimator lens array 27 is disposed opposite the outgoing end face 26 of the fiber bundle 24. The collimator lens array 27 is formed by disposing, in an array, a plurality of collimator lenses that is individually provided for the optical fibers 25, and the light of the peak wavelengths transmitted by the optical fibers 25 individually enters the collimator lenses.

As illustrated in FIG. 7, the optical fibers 25 of the fiber bundle 24 are individually and optically coupled to the light of the peak wavelengths, and on the outgoing end face 26 of the fiber bundle 24, for example, the collimator lens array 27 is disposed so as to control the divergence of the light, with the result that it is possible to spatially separate the light. Even in a case where in such a configuration, the light source unit 30 emits the light of the individual peak wavelengths that are separated only about several nanometers apart, the prism 23 and the fiber bundle 24 are separated spatially and sufficiently so as to be disposed, and thus it is possible to spatially separate the light at each of the peak wavelengths.

[1.3 Basic Configuration Example of Projector]

Figure 8:
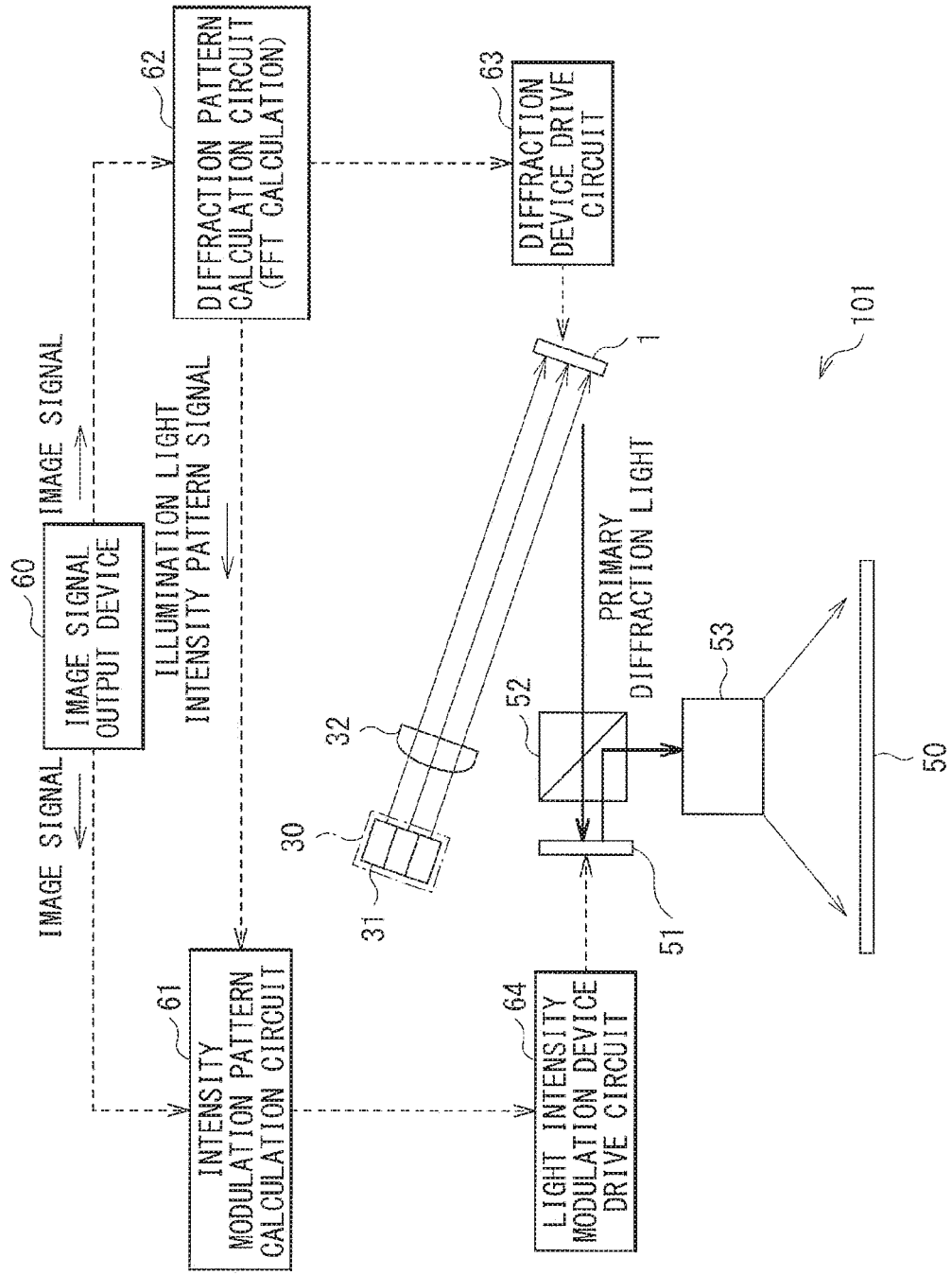
FIG. 8 is a configuration diagram that schematically illustrates a basic configuration example of a projector according to the first embodiment.

FIG. 8 schematically illustrates a basic configuration example of a projector 101 according to the first embodiment.

The projector 101 includes an image signal output device 60, an intensity modulation pattern calculation circuit 61, a diffraction pattern calculation circuit 62, a diffraction device drive circuit 63, and a light intensity modulation device drive circuit 64. The projector 101 also includes the diffraction device 1, the light source unit 30, a beam shaping optical system 32, a spatial light intensity modulation device 51, a polarization separation device (PBS) 52, and a projection lens 53.

FIG. 8 illustrates a basic configuration example of the projector 101 in a case where the light source unit 30 includes a plurality of light sources 31 each of which has a different peak wavelength.

The light sources 31 are, for example, laser light sources. The beam shaping optical system 32 spatially separates and shapes the light of the individual peak wavelengths emitted from the individual light sources so as to illuminate, as illustrated in FIG. 2, the individual divided areas 10 of the diffraction device 1 by the light of the individual peak wavelengths. The diffraction device 1 is a spatial optical phase modulation device, and includes, for example, a spatial optical phase modulation device such as SLM. As illustrated in FIG. 2, the diffraction device 1 displays a diffraction pattern that is optimized at a corresponding peak wavelength out of each of the peak wavelengths.

The image signal output device 60 outputs an image signal to the intensity modulation pattern calculation circuit 61 and the diffraction pattern calculation circuit 62.

In the diffraction pattern calculation circuit 62, the diffraction pattern to be displayed on the diffraction device 1 is calculated on the basis of the image signal. The diffraction pattern to be displayed on the diffraction device 1 is a diffraction pattern which makes it possible to form an illumination image that has a luminance distribution corresponding to an image displayed. The diffraction pattern calculation circuit 62 extracts, for example, from the image signal, a portion which is equal to or more than a threshold value for the luminance level of the image, and repeatedly performs FFT (Fast Fourier Transform) calculation so as to calculate the diffraction pattern. Here, the diffraction pattern calculation circuit 62 previously holds information related to the peak wavelengths of the light source unit 30 and information related to the division pattern of the individual divided areas 10 in the diffraction device 1, and calculates, as the diffraction pattern, as illustrated in FIG. 2, a diffraction pattern that is optimized at a corresponding peak wavelength out of each of the peak wavelengths in the corresponding divided area 10. Further, the diffraction pattern calculation circuit 62 outputs an illumination light intensity modulation pattern signal to the intensity modulation pattern calculation circuit 61. The illumination light intensity modulation pattern signal indicates information related to the luminance distribution of the illumination image formed by the diffraction pattern.

The diffraction device drive circuit 63 drives the diffraction device 1 so as to display the diffraction pattern calculated in the diffraction pattern calculation circuit 62.

The intensity modulation pattern calculation circuit 61 calculates, on the basis of the image signal, an intensity modulation pattern for generating an image to be displayed on the spatial light intensity modulation device 51. Here, the intensity modulation pattern with consideration given to the information related to the luminance distribution of the illumination image formed by the diffraction device 1 is calculated.

The light intensity modulation device drive circuit 64 drives the spatial light intensity modulation device 51 so as to generate the intensity modulation pattern calculated in the intensity modulation pattern calculation circuit 61.

The polarization separation device 52 transmits a first polarization component of light that enters the polarization separation device 52, and reflects a second polarization component orthogonal to the first polarization component. The illumination image formed by the diffraction device 1 is applied as the illumination light to the spatial light intensity modulation device 51 through the polarization separation device 52. The spatial light intensity modulation device 51 performs intensity modulation on the illumination light on the basis of the intensity modulation pattern calculated in the intensity modulation pattern calculation circuit 61 so as to generate a projection image. Since as described above, in the intensity modulation pattern calculated in the intensity modulation pattern calculation circuit 61, consideration has been given to the information related to the luminance distribution of the illumination image formed by the diffraction device 1, the projection image for reproducing the original image signal is consequently generated by the spatial light intensity modulation device 51.

The projection image generated by the spatial light intensity modulation device 51 is emitted by the polarization separation device 52 toward the projection lens 53. The projection lens 53 is a projection optical system that includes a plurality of lenses, and projects the projection image generated by the spatial light intensity modulation device 51 to a projection surface such as a screen 50.

[1.4 Method of Calculating Diffraction Pattern at Each Peak Wavelength]

An example of a method of calculating a diffraction pattern at each of the peak wavelengths in the corresponding divided area will be described with reference to FIG. 9.

Figure 9:
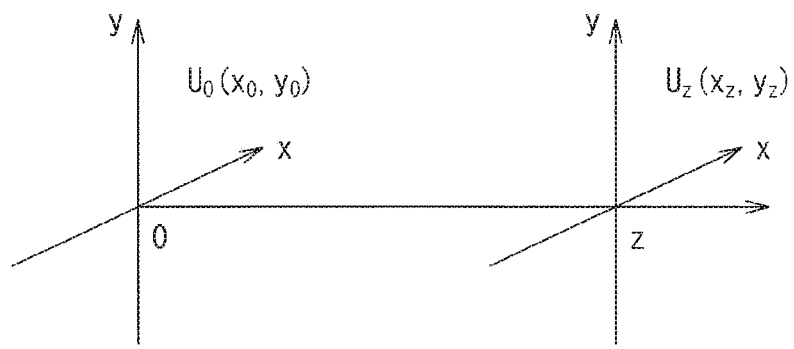
FIG. 9 is an illustrative diagram of a method of calculating a diffraction pattern at each of peak wavelengths.

As illustrated in FIG. 9, a phase distribution in a certain reference position (z=0, ($x_0$, $y_0$)) at a certain reference wavelength $\lambda$ is assumed to be $U_0$ ($x_0$, $y_0$). A phase distribution $U_z$ ($x_z$, $y_z$) in any position (($x_z$, $y_z$)) in a z direction is represented by formula (1) below with a Fresnel calculation formula by convolution.

Here, it is assumed that $\Delta x$, $\Delta y$ are a pixel size in the input surface of the diffraction device 1. N is the number of pixels in the diffraction device 1 and m', n' are integers.

[Mathematical Formula 1]

$$U_z(x_z, y_z) = DFT^{-1}\left[DFT(U_0) \cdot \exp\left\{-i\lambda z\pi\left\{\left(\frac{m'}{N\Delta x}\right)^2 + \left(\frac{n'}{N\Delta y}\right)^2\right\}\right\}\right] \quad (1)$$

Here, when it is assumed that $\lambda = \alpha^2 \cdot \Lambda$, a phase distribution $U_z$ ($x_z$, $y_z$) at a target wavelength $\Lambda$ different from the reference wavelength $\lambda$ is represented by formula (2) below.

[Mathematical Formula 2]

$$U_z(x_z, y_z) = \\ DFT^{-1}\left[DFT(U_0) \cdot \exp\left\{-i\Lambda z\pi\left\{\left(\frac{m'}{(N/\alpha)\cdot\Delta x}\right)^2 + \left(\frac{n'}{(N/\alpha)\cdot\Delta y}\right)^2\right\}\right\}\right] \quad (2)$$

The number of pixels N is changed from formula (2), and thus it is possible to convert the phase distribution at the reference wavelength $\lambda$ to the phase distribution at the target wavelength $\Lambda$. Hence, for example, when in the projector 101 of FIG. 8, the diffraction pattern calculation circuit 62 calculates the diffraction pattern at each of the peak wavelengths, FFT calculation is performed on a diffraction pattern at a certain reference peak wavelength, and calculation for changing the number of pixels N in the input surface of the diffraction device 1 is performed on the diffraction pattern at each of the other peak wavelengths, with the result that it is possible to simply derive the diffraction pattern. In this way, it is possible to reduce the amount of calculation when the diffraction pattern at each of the peak wavelengths is calculated.

[1.5 Configuration Example of Full-Color Projector]

Configuration examples of a full-color projector will be described next as variations of the projector. The configurations of a drive circuit and the like in each of the configuration examples below may be substantially the same as those of the projector 101 in FIG. 8. In the following description, substantially the same portions as the constituent elements of the projector 101 in FIG. 8 are identified with the same symbols, and description thereof will be omitted as necessary.

First Configuration Example

Figure 10:
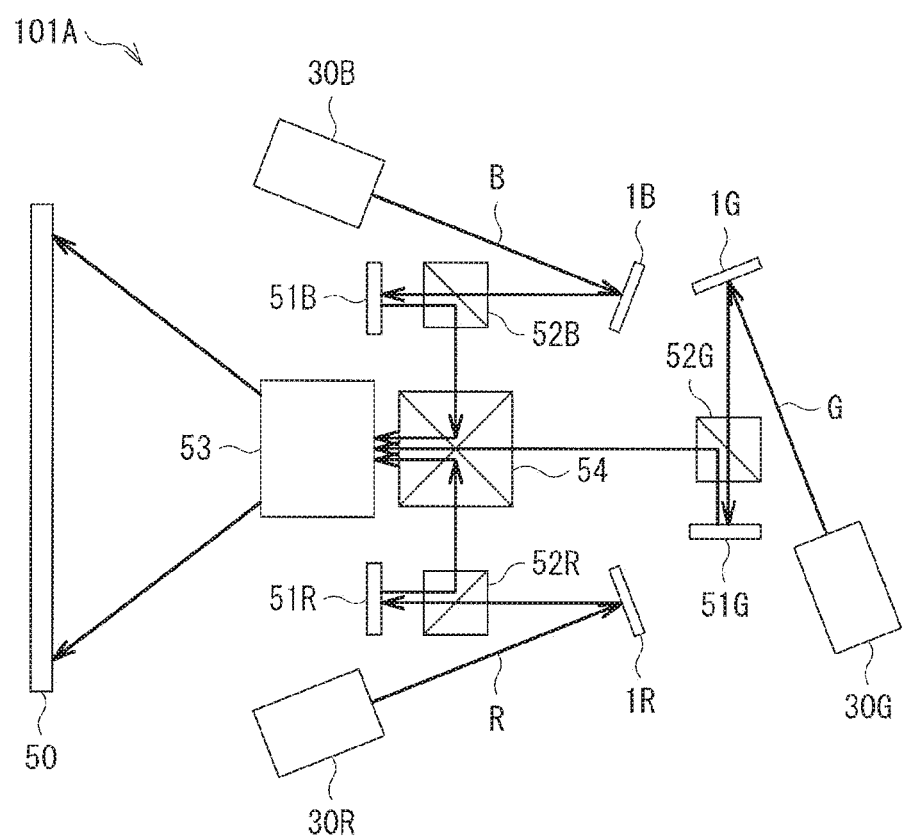
FIG. 10 is a configuration diagram that schematically illustrates a first configuration example of a full-color projector according to the first embodiment.

FIG. 10 schematically illustrates a first configuration example of a full-color projector according to the first embodiment.

The projector 101A according to the first configuration example of FIG. 10 includes, as the light source unit 30, a red light source unit 30R, a green light source unit 30G, and a blue light source unit 30B.

The red light source unit 30R includes, for example, a plurality of laser light sources that emits light (red light) in a red (R) wavelength range that has peak wavelengths different from each other. The red light source unit 30R may emit, from a single light source, red light that has a plurality of peak wavelengths.

The green light source unit 30G includes, for example, a plurality of laser light sources that emits light (green light) in a green (G) wavelength range that has peak wavelengths different from each other. The green light source unit 30G may emit, from a single light source, green light that has a plurality of peak wavelengths.

The blue light source unit 30B includes, for example, a plurality of laser light sources that emits light (blue light) in a blue (B) wavelength range that has peak wavelengths different from each other. The blue light source unit 30B may emit, from a single light source, blue light that has a plurality of peak wavelengths.

The projector 101A includes, as the diffraction device 1, a red diffraction device 1R, a green diffraction device 1G, and a blue diffraction device 1B. In the projector 101A, each of the red diffraction device 1R the green diffraction device 1G, and the blue diffraction device 1B includes a reflective spatial optical phase modulation device such as a reflective SLM.

Substantially as in the diffraction device 1 illustrated in FIG. 2, in the red diffraction device 1R, each of the divided areas 10 is illuminated with red light of the corresponding peak wavelength. The red diffraction device 1R displays a diffraction pattern that is optimized at a corresponding peak wavelength out of each of the peak wavelengths of the red light.

Substantially as in the diffraction device 1 illustrated in FIG. 2, in the green diffraction device 1G, each of the divided areas 10 is illuminated with green light of the corresponding peak wavelength. The green diffraction device 1G displays a diffraction pattern that is optimized at a corresponding peak wavelength out of each of the peak wavelengths of the green light.

Substantially as in the diffraction device 1 illustrated in FIG. 2, in the blue diffraction device 1B, each of the divided areas 10 is illuminated with blue light of the corresponding peak wavelength. The blue diffraction device 1B displays a diffraction pattern that is optimized at a corresponding peak wavelength out of each of the peak wavelengths of the green light.

The projector 101A includes, as the spatial light intensity modulation device 51, a red spatial light intensity modulation device 51R, a green spatial light intensity modulation device 51G, and a blue spatial light intensity modulation device 51B. In the projector 101A, each of the red spatial light intensity modulation device 51R, the green spatial light intensity modulation device 51G, and the blue spatial light intensity modulation device 51B includes a reflective spatial light intensity modulation device such as a reflective liquid crystal display panel.

The projector 101A includes, as the polarization separation device 52, a red polarization separation device 52R, a green polarization separation device 52G, and a blue polarization separation device 52B. The projector 101A also includes a cross prism 54.

The illumination image by the red light formed by the red diffraction device 1R is applied as the illumination light to the red spatial light intensity modulation device 51R through the red polarization separation device 52R. The red spatial light intensity modulation device 51R performs intensity modulation on the illumination light of the red light on the basis of the intensity modulation pattern calculated in the intensity modulation pattern calculation circuit 61 so as to generate the projection image of the red light.

The illumination image by the green light formed by the green diffraction device 1G is applied as the illumination light to the green spatial light intensity modulation device 51G through the green polarization separation device 52G. The green spatial light intensity modulation device 51G performs intensity modulation on the illumination light of the green light on the basis of the intensity modulation pattern calculated in the intensity modulation pattern calculation circuit 61 so as to generate the projection image of the green light.

The illumination image by the blue light formed by the blue diffraction device 1B is applied as the illumination light to the blue spatial light intensity modulation device 51B through the blue polarization separation device 52B. The blue spatial light intensity modulation device 51B performs intensity modulation on the illumination light of the blue light on the basis of the intensity modulation pattern calculated in the intensity modulation pattern calculation circuit 61 so as to generate the projection image of the blue light.

The projection images of the individual colors including the red light, the green light, and the blue light are combined by the cross prism 54 as a full-color projection image, and the full-color projection image is emitted toward the projection lens 53. The projection lens 53 projects the full-color projection image on the projection surface such as the screen 50.

Second Configuration Example

Figure 11:
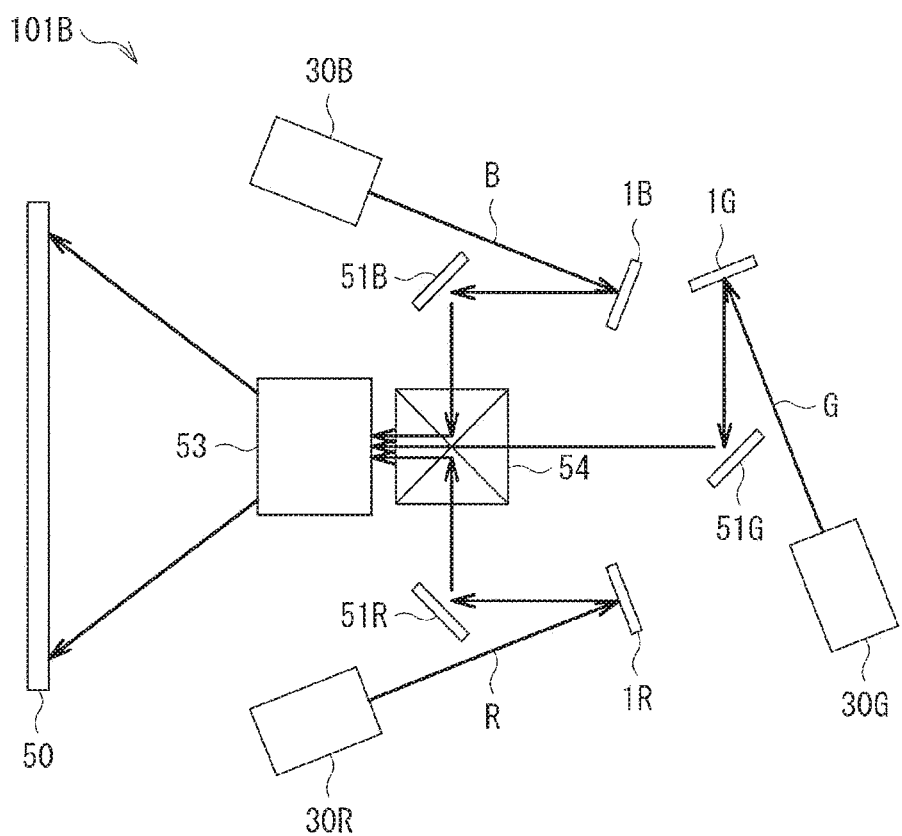
FIG. 11 is a configuration diagram that schematically illustrates a second configuration example of the full-color projector according to the first embodiment.

FIG. 11 schematically illustrates a second configuration example of the full-color projector according to the first embodiment.

In the projector 101B of FIG. 11 according to the second configuration example, as compared with the configuration of the projector 101A of FIG. 10 according to the first configuration example, each of the red spatial light intensity modulation device 51R, the green spatial light intensity modulation device 51G, and the blue spatial light intensity modulation device 51B includes a reflective spatial light intensity modulation device such as DMD. Since the projector 101B includes the DMD, as compared with the configuration of the projector 101A of FIG. 10 according to the first configuration example, the red polarization separation device 52R, the green polarization separation device 52G, and the blue polarization separation device 52B are omitted from the configuration.

The other configurations may be substantially the same as those of the projector 101A of FIG. 10 according to the first configuration example.

Third Configuration Example

Figure 12:
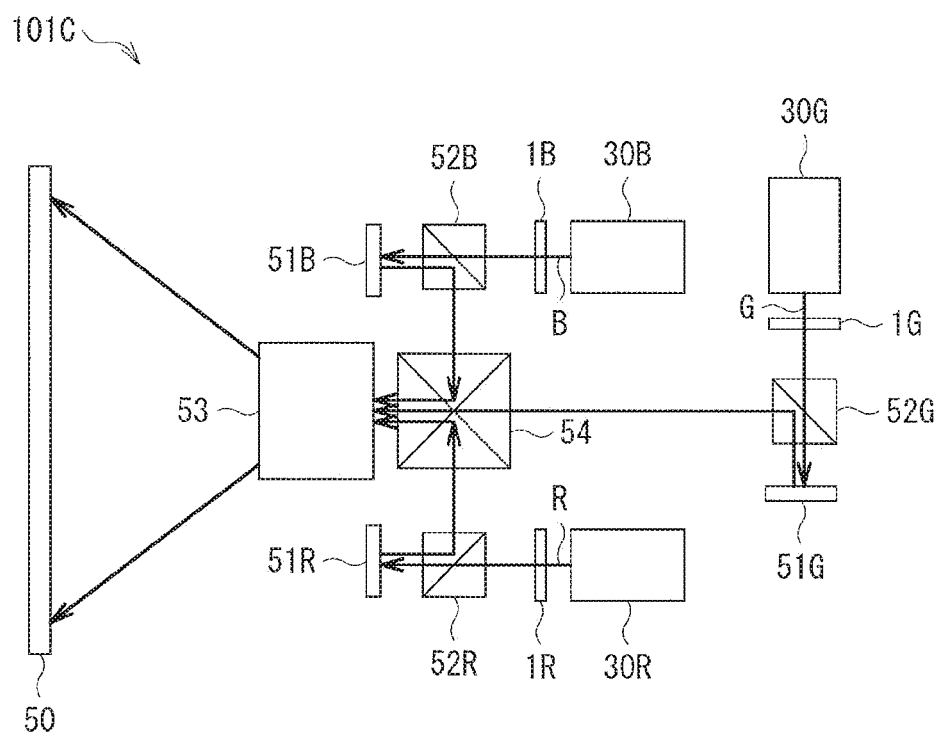
FIG. 12 is a configuration diagram that schematically illustrates a third configuration example of the full-color projector according to the first embodiment.

FIG. 12 schematically illustrates a third configuration example of the full-color projector according to the first embodiment.

In the projector 101C of FIG. 12 according to the third configuration example, as compared with the configuration of the projector 101A of FIG. 10 according to the first configuration example, each of the red diffraction device 1R, the green diffraction device 1G, and the blue diffraction device 1B includes a transmissive spatial optical phase modulation device such as a reflective SLM.

The other configurations may be substantially the same as those of the projector 101A of FIG. 10 according to the first configuration example.

Fourth Configuration Example

Figure 13:
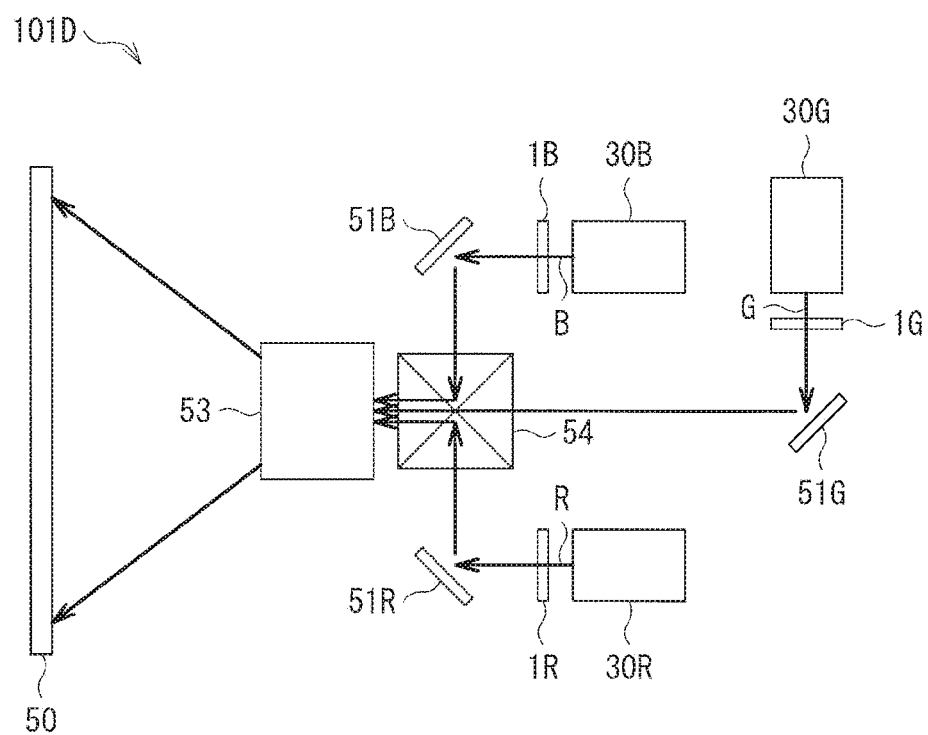
FIG. 13 is a configuration diagram that schematically illustrates a fourth configuration example of the full-color projector according to the first embodiment.

FIG. 13 schematically illustrates a fourth configuration example of the full-color projector according to the first embodiment.

In the projector 101D of FIG. 13 according to the fourth configuration example, as compared with the configuration of the projector 101A of FIG. 10 according to the first configuration example, each of the red diffraction device 1R, the green diffraction device 1G, and the blue diffraction device 1B includes a transmissive spatial optical phase modulation device such as a reflective SLM.

Further, in the projector 101D, as compared with the configuration of the projector 101A of FIG. 10 according to the first configuration example, each of the red spatial light intensity modulation device 51R, the green spatial light intensity modulation device 51G, and the blue spatial light intensity modulation device 51B includes a reflective spatial light intensity modulation device such as a DMD. Since the projector 101D includes the DMD, as compared with the configuration of the projector 101A of FIG. 10 according to the first configuration example, the red polarization separation device 52R, the green polarization separation device 52G, and the blue polarization separation device 52B are omitted from the configuration.

The other configurations may be substantially the same as those of the projector 101A of FIG. 10 according to the first configuration example.

Fifth Configuration Example

Figure 14:
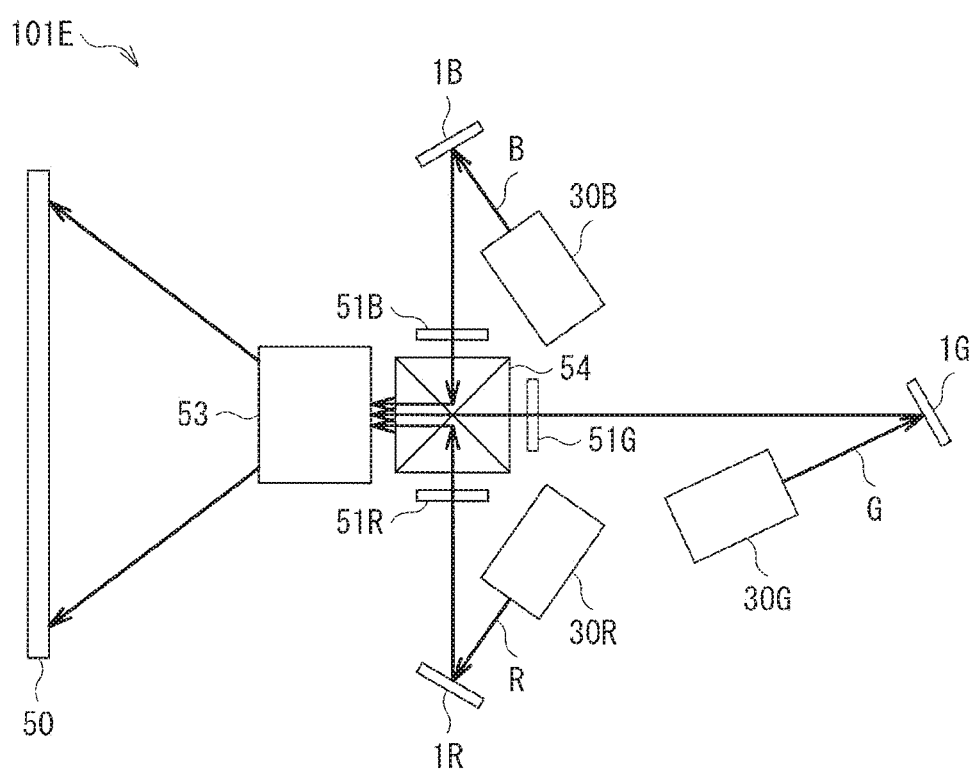
FIG. 14 is a configuration diagram that schematically illustrates a fifth configuration example of the full-color projector according to the first embodiment.

FIG. 14 schematically illustrates a fifth configuration example of the full-color projector according to the first embodiment.

In the projector 101E of FIG. 14 according to the fifth configuration example, as compared with the configuration of the projector 101A of FIG. 10 according to the first configuration example, each of the red spatial light intensity modulation device 51R, the green spatial light intensity modulation device 51G, and the blue spatial light intensity modulation device 51B includes a transmissive spatial light intensity modulation device such as a transmissive liquid crystal display panel. Since the projector 101E includes the transmissive liquid crystal display panel, as compared with the configuration of the projector 101A of FIG. 10 according to the first configuration example, the red polarization separation device 52R, the green polarization separation device 52G, and the blue polarization separation device 52B are omitted from the configuration.

The other configurations may be substantially the same as those of the projector 101A of FIG. 10 according to the first configuration example.

Sixth Configuration Example

Figure 15:
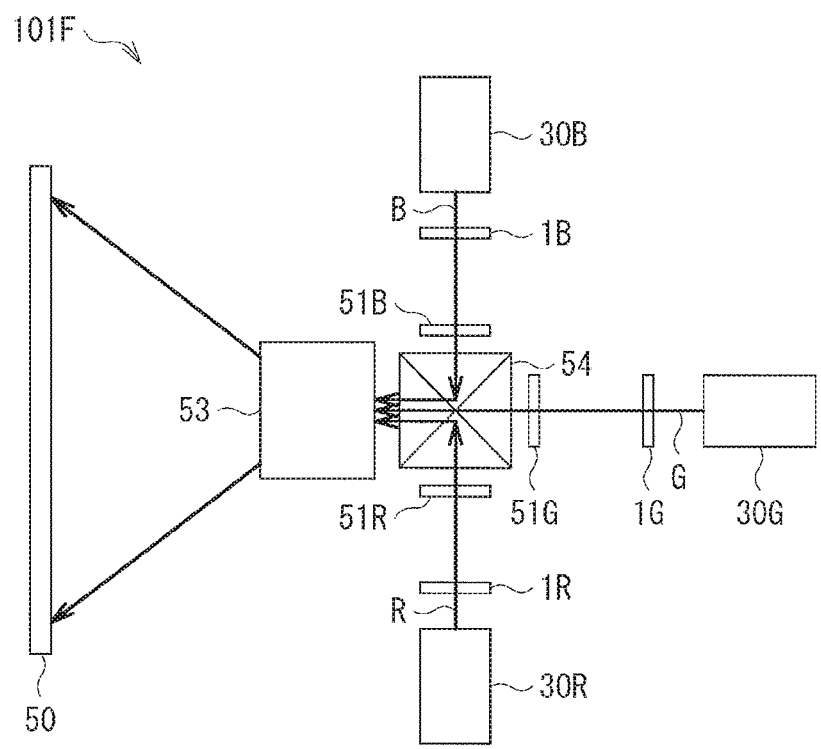
FIG. 15 is a configuration diagram that schematically illustrates a sixth configuration example of the full-color projector according to the first embodiment.

FIG. 15 schematically illustrates a sixth configuration example of the full-color projector according to the first embodiment.

In the projector 101F of FIG. 15 according to the sixth configuration example, as compared with the configuration of the projector 101A of FIG. 10 according to the first configuration example, each of the red diffraction device 1R the green diffraction device 1G, and the blue diffraction device 1B includes a transmissive spatial optical phase modulation device such as a transmissive SLM.

Further, in the projector 101F, as compared with the configuration of the projector 101A of FIG. 10 according to the first configuration example, each of the red spatial light intensity modulation device 51R, the green spatial light intensity modulation device 51G, and the blue spatial light intensity modulation device 51B includes a transmissive spatial light intensity modulation device such as a transmissive liquid crystal display panel. Since the projector 101F includes the transmissive liquid crystal display panel, as compared with the configuration of the projector 101A of FIG. 10 according to the first configuration example, the red polarization separation device 52R, the green polarization separation device 52G, and the blue polarization separation device 52B are omitted from the configuration.

The other configurations may be substantially the same as those of the projector 101A of FIG. 10 according to the first configuration example.

Seventh Configuration Example

Figure 16:
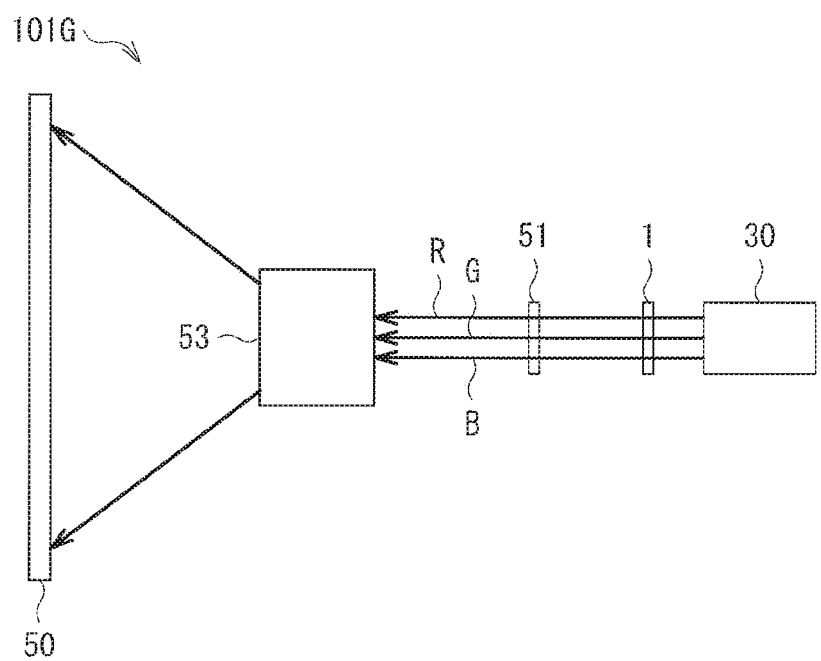
FIG. 16 is a configuration diagram that schematically illustrates a seventh configuration example of the full-color projector according to the first embodiment.

FIG. 16 schematically illustrates a seventh configuration example of the full-color projector according to the first embodiment.

The projector 101G of FIG. 16 according to the seventh configuration example includes the light source unit 30, the diffraction device 1, and the spatial light intensity modulation device 51. The projector 101G performs full-color display in a time-division manner.

In the projector 101G, the diffraction device 1 includes a transmissive spatial optical phase modulation device such as a transmissive SLM. The spatial light intensity modulation device 51 includes a transmissive spatial light intensity modulation device such as a transmissive liquid crystal display panel.

The light source unit 30 includes a red light source that emits red light having a plurality of peak wavelengths, a green light source that emits green light having a plurality of peak wavelengths, and a blue light source that emits blue light having a plurality of peak wavelengths. Each of the red light source, the green light source, and the blue light source includes, for example, one or a plurality of laser light sources. The light source unit 30 emits, in a time-division manner, the red light having the plurality of peak wavelengths, the green light having the plurality of peak wavelengths, and the blue light having the plurality of peak wavelengths.

In the projector 101G, substantially as in the diffraction device 1 illustrated in FIG. 2, in the diffraction device 1, each of the divided areas 10 is illuminated with light of the corresponding peak wavelength from the light source unit 30. Here, the diffraction device 1 is illuminated with the red light, the green light, and the blue light in a time-division manner for each of the colors. The diffraction device 1 displays, for each of the colors, in a time-division manner, a diffraction pattern that is optimized at a corresponding peak wavelength out of each of the peak wavelengths.

In the projector 101G, the illumination images of the individual colors formed by the diffraction device 1 are applied as the illumination light to the spatial light intensity modulation device 51 in a time-division manner for each of the colors. In synchronization with timing at which the light source unit 30 emits each of the pieces of colored light, the spatial light intensity modulation device 51 performs intensity modulation on the illumination light of the corresponding color on the basis of the intensity modulation pattern calculated in the intensity modulation pattern calculation circuit 61 so as to generate the projection images of the individual colors in a time-division manner.

The projection images of the individual colors including the red light, the green light, and the blue light are emitted toward the projection lens 53. The projection lens 53 projects the projection images of the individual colors on the projection surface such as the screen 50 in a time-division manner.

The other configurations may be substantially the same as those of the projector 101A of FIG. 8.

Eighth Configuration Example

Figure 17:
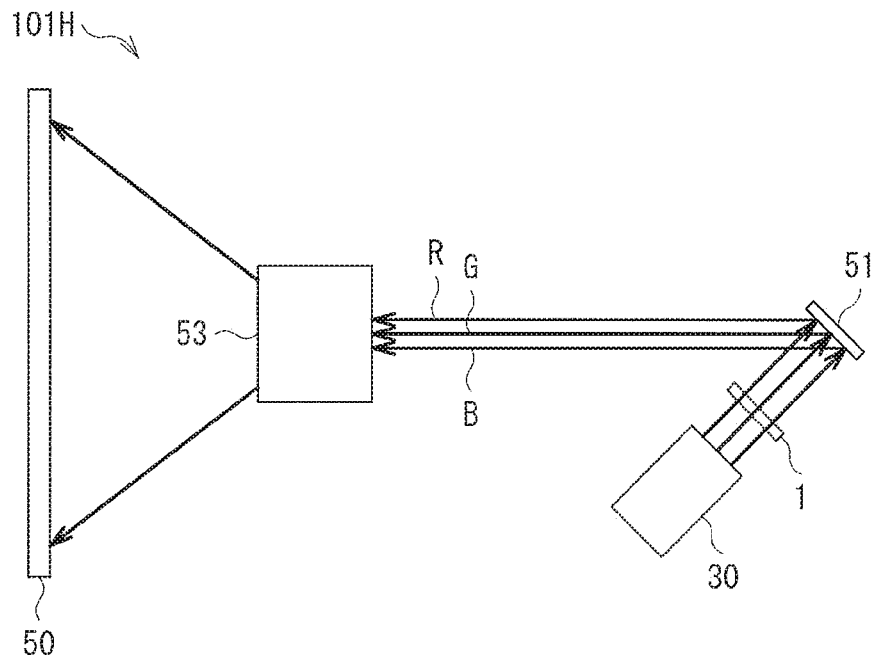
FIG. 17 is a configuration diagram that schematically illustrates an eighth configuration example of the full-color projector according to the first embodiment.

FIG. 17 schematically illustrates an eighth configuration example of the full-color projector according to the first embodiment.

In the projector 101H of FIG. 17 according to the eighth configuration example, as compared with the configuration of the projector 101G of FIG. 16 according to the seventh configuration example, the spatial light intensity modulation device 51 includes a reflective spatial light intensity modulation device such as DMD.

The other configurations may be substantially the same as those of the projector 101G of FIG. 16 according to the seventh configuration example.

Ninth Configuration Example

Figure 18:
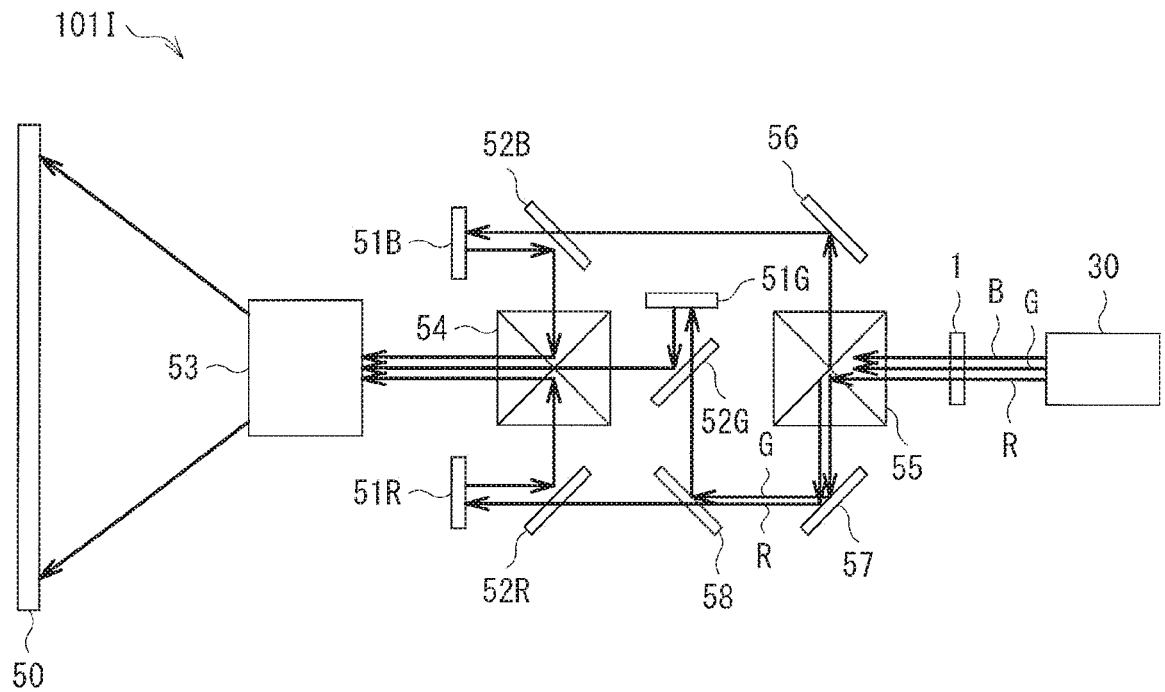
FIG. 18 is a configuration diagram that schematically illustrates a ninth configuration example of the full-color projector according to the first embodiment.

FIG. 18 schematically illustrates a ninth configuration example of the full-color projector according to the first embodiment.

As compared with the configuration of the projector 101A of FIG. 10 according to the first configuration example, the projector 101I of FIG. 18 according to the ninth configuration example includes a single light source unit 30 and a single diffraction device 1. In the projector 101I, substantially as with the projector 101G of FIG. 16 according to the seventh configuration example, for each of the colors, a diffraction pattern that is optimized at a corresponding peak wavelength out of each of the peak wavelengths is displayed with the light source unit 30 and the diffraction device 1 in a time-division manner.

In the projector 101I, the diffraction device 1 includes a transmissive spatial optical phase modulation device such as a transmissive SLM.

The projector 101I includes, as the spatial light intensity modulation device 51, the red spatial light intensity modulation device 51R, the green spatial light intensity modulation device 51G, and the blue spatial light intensity modulation device 51B. In the projector 101I, each of the red spatial light intensity modulation device 51R, the green spatial light intensity modulation device 51G, and the blue spatial light intensity modulation device 51B includes a reflective spatial light intensity modulation device such as a reflective liquid crystal display panel.

The projector 101I further includes a cross prism 55, a reflective mirror 56, a reflective mirror 57, and a dichroic mirror 58.

The cross prism 55 separates the illumination light of the individual pieces of colored light generated by the diffraction device 1 into the illumination light of blue and the illumination light of red and green.

The illumination light of blue is applied by the reflective mirror 56 toward the blue polarization separation device 52B and the blue spatial light intensity modulation device 51B.

The illumination light of red and green is reflected by the reflective mirror 57 and is thereafter divided by the dichroic mirror 58 into the illumination light of red and the illumination light of green.

The illumination light of red is applied by the dichroic mirror 58 toward the red polarization separation device 52R and the red spatial light intensity modulation device 51R.

The illumination light of green is applied by the dichroic mirror 58 toward the green polarization separation device 52G and the green spatial light intensity modulation device 51G.

The other configurations may be substantially the same as those of the projector 101A of FIG. 10 according to the first configuration example.

Tenth Configuration Example

Figure 19:
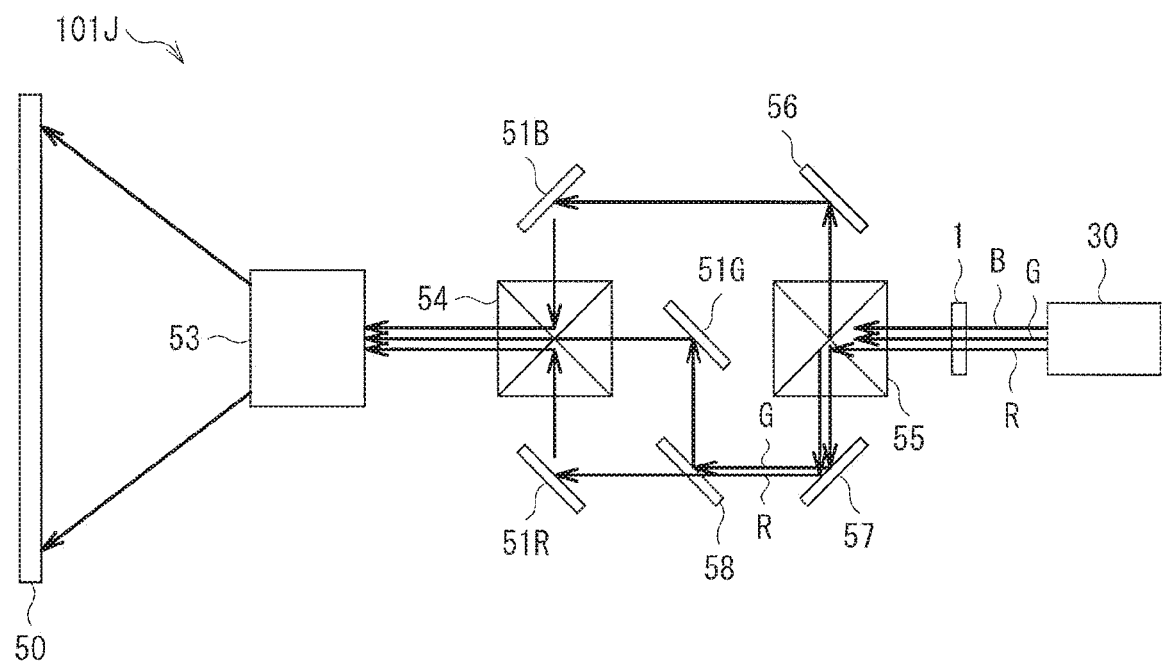
FIG. 19 is a configuration diagram that schematically illustrates a tenth configuration example of the full-color projector according to the first embodiment.

FIG. 19 schematically illustrates a tenth configuration example of the full-color projector according to the first embodiment.

In the projector 101J of FIG. 19 according to the tenth configuration example, as compared with the configuration of the projector 101I of FIG. 18 according to the ninth configuration example, each of the red spatial light intensity modulation device 51R, the green spatial light intensity modulation device 51G, and the blue spatial light intensity modulation device 51B includes a reflective spatial light intensity modulation device such as DMD. Since the projector 101J includes the DMD, as compared with the configuration of the projector 101I of FIG. 18 according to the ninth configuration example, the red polarization separation device 52R, the green polarization separation device 52G, and the blue polarization separation device 52B are omitted from the configuration.

The other configurations may be substantially the same as those of the projector 101I of FIG. 18 according to the ninth configuration example.

Eleventh Configuration Example

Figure 20:
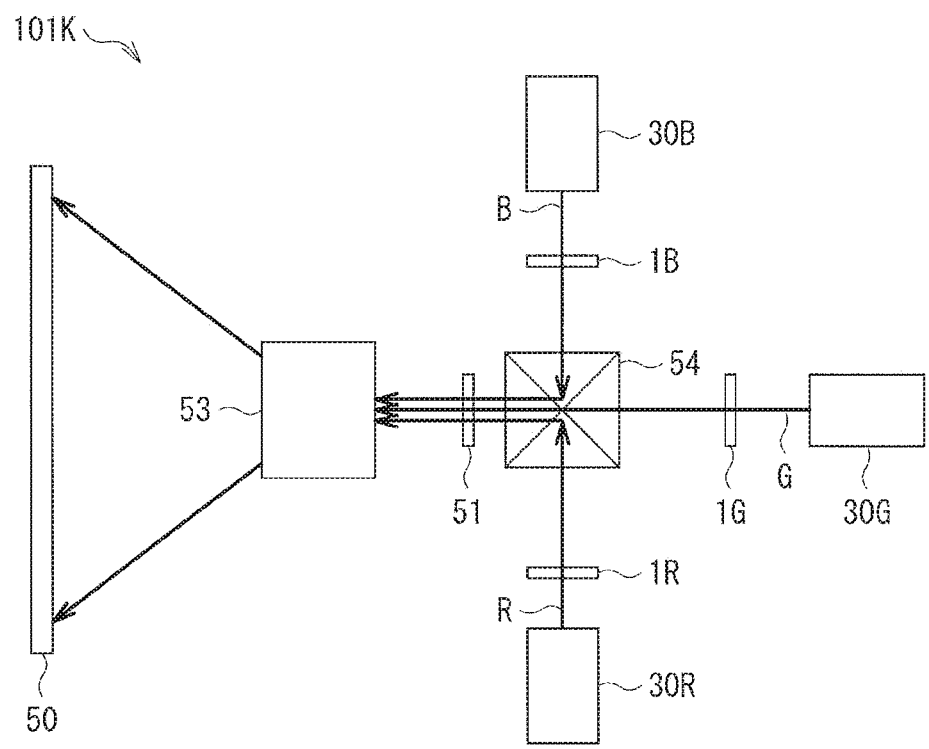
FIG. 20 is a configuration diagram that schematically illustrates an eleventh configuration example of the full-color projector according to the first embodiment.

FIG. 20 schematically illustrates an eleventh configuration example of the full-color projector according to the first embodiment.

The projector 101K of FIG. 20 according to the eleventh configuration example includes, as with the projector 101F of FIG. 15 according to the sixth configuration example, the red diffraction device 1R, the green diffraction device 1G, and the blue diffraction device 1B each of which includes a transmissive spatial optical phase modulation device such as a transmissive SLM.

Further, as compared with the configuration of the projector 101F of FIG. 15 according to the sixth embodiment, the projector 101K includes a single spatial light intensity modulation device 51 instead of the red spatial light intensity modulation device 51R, the green spatial light intensity modulation device 51G, and the blue spatial light intensity modulation device 51B. The spatial light intensity modulation device 51 includes a transmissive spatial light intensity modulation device such as a transmissive liquid crystal display panel.

In the projector 101K, the spatial light intensity modulation device 51 is disposed between the cross prism 54 and the projection lens 53. The illumination images of the individual colors formed by the red diffraction device 1R, the green diffraction device 1G, and the blue diffraction device 1B are applied, through the cross prism 54, as the illumination light, to the spatial light intensity modulation device 51 in a time-division manner for each of the colors. The spatial light intensity modulation device 51 performs intensity modulation on the illumination light of each of the colors on the basis of the intensity modulation pattern calculated in the intensity modulation pattern calculation circuit 61 so as to generate the projection images of the individual colors in a time-division manner.

The projection images of the individual colors including the red light, the green light, and the blue light are emitted toward the projection lens 53. The projection lens 53 projects the projection images of the individual colors on the projection surface such as the screen 50 in a time-division manner.

The other configurations may be substantially the same as those of the projector 101 of FIG. 8.

Twelfth Configuration Example

Figure 21:
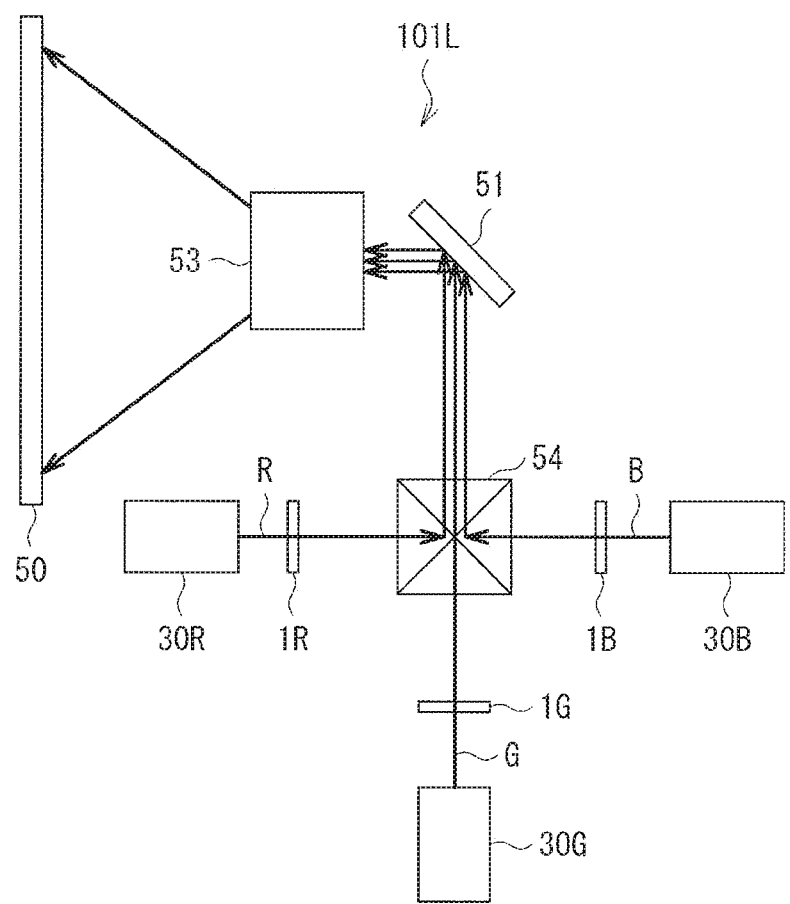
FIG. 21 is a configuration diagram that schematically illustrates a twelfth configuration example of the full-color projector according to the first embodiment.

FIG. 21 schematically illustrates a twelfth configuration example of the full-color projector according to the first embodiment.

In the projector 101L of FIG. 21 according to the twelfth configuration example, as compared with the configuration of the projector 101K of FIG. 20 according to the eleventh configuration example, the spatial light intensity modulation device 51 includes a reflective spatial light intensity modulation device such as DMD.

The other configurations may be substantially the same as those of the projector 101K of FIG. 20 according to the eleventh configuration example.

[1.6 Effects]

As described above, in the present embodiment, the diffraction device 1 includes the plurality of divided areas 10, and the diffraction pattern that is optimized at a corresponding peak wavelength out of each of the peak wavelengths is displayed on each of the divided areas 10. The plurality of divided areas 10 allows the light of the plurality of peak wavelengths to enter the plurality of divided areas 10 individually for each of the pieces of colored light. Hence, it is possible to obtain a clear illumination image by use of the light having the plurality of peak wavelengths.

Since in the present embodiment, the diffraction pattern that is optimized at each of the wavelengths is displayed on the diffraction device 1, when the light diffracted in the individual divided areas 10 of the diffraction device 1 is superimposed on a certain target surface as illustrated in FIG. 2, it is possible to generate clear illumination light. In the illumination light superimposed by the light sources of different peak wavelengths, it is also possible to reduce speckles specific to laser that are based on the number of wavelengths and the wavelength widths of the individual light sources.

The effects described in the present specification are simply illustrative and are not restrictive, and any other effect may be achieved. The same is true for effects in the other embodiments which will be described below.

2. SECOND EMBODIMENT

An illuminator and a projector according to a second embodiment of the present disclosure will then be described. In the following description, substantially the same portions as the constituent elements of the illuminator and the projector according to the first embodiment described above are identified with the same symbols, and description thereof will be omitted as necessary.

[2.1 Configuration and Operation]

Figure 22:
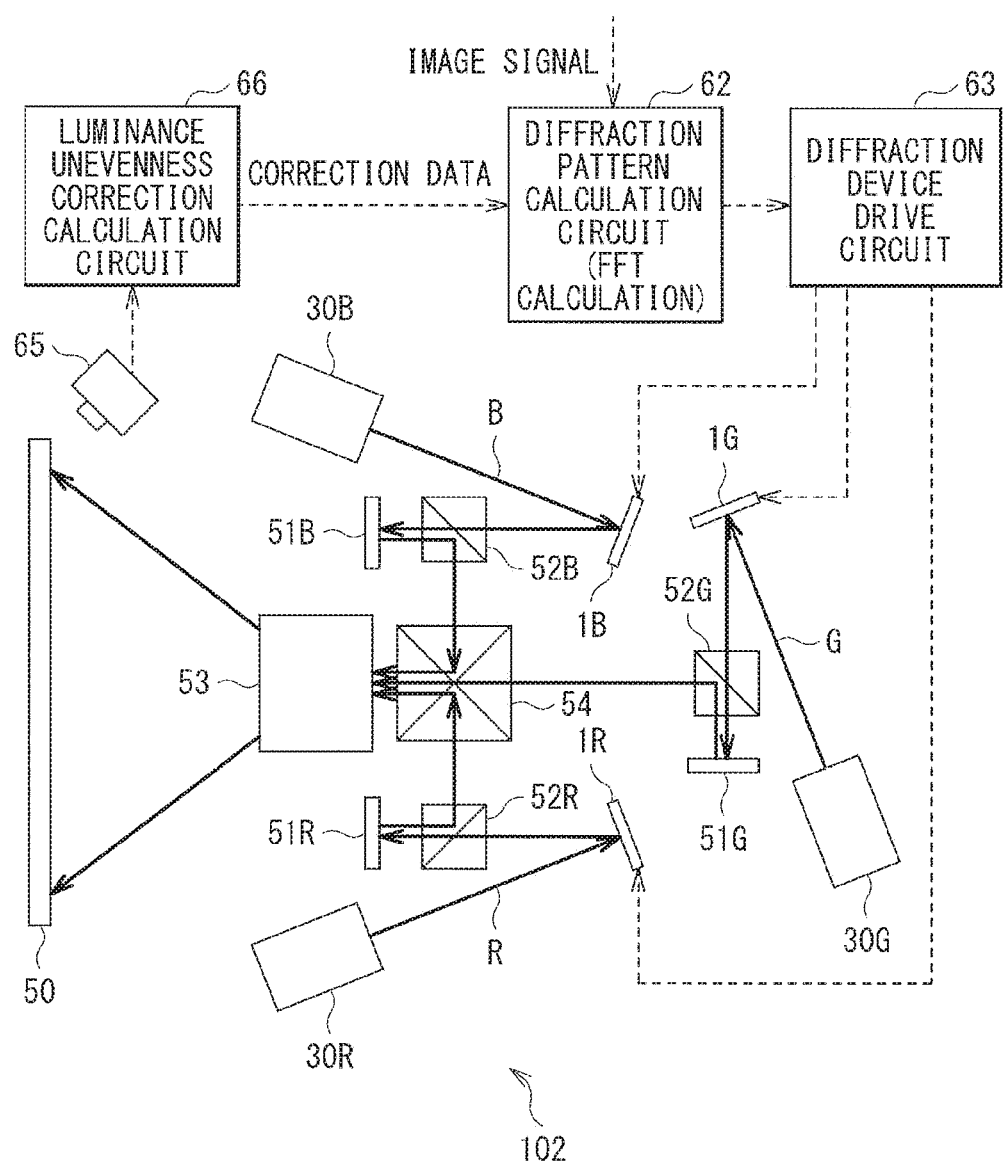
FIG. 22 is a configuration diagram that schematically illustrates a configuration example of a projector according to a second embodiment.

FIG. 22 schematically illustrates a configuration example of the projector 102 according to the second embodiment of the present disclosure.

Although FIG. 22 illustrates the configuration example based on the configurations of the projector 101 of FIG. 8 and the projector 101A of FIG. 10, a configuration based on the configurations of FIGS. 11 to 21 may be adopted.

The projector 102 according to the second embodiment of the present disclosure includes a luminance measurement unit 65 and a luminance unevenness correction calculation circuit 66.

The luminance measurement unit 65 measures the luminance of a projection image projected on the screen 50. The luminance measurement unit 65 includes an imaging device that makes it possible to perform imaging of the luminance, such as a two-dimensional color luminance meter or the like. In the case of a full-color projector, the luminance measurement unit 65 measures, for each of the colors, a luminance distribution at each of the peak wavelengths.

The luminance unevenness correction calculation circuit 66 calculates, on the basis of the result of the measurement of the luminance by the luminance measurement unit 65, correction data for correcting luminance unevenness that occurs in the projection image. The luminance unevenness correction calculation circuit 66 outputs the calculated correction data to the diffraction pattern calculation circuit 62. In the case of a full-color projector, the diffraction pattern calculation circuit 62 calculates, on the basis of the correction data and the image signal, for each of the colors, a diffraction pattern that is optimized at a corresponding peak wavelength out of each of the peak wavelengths in the corresponding divided area 10.

The other configurations may be substantially the same as those of the projector 101 of FIG. 8 or the projector 101A of FIG. 10.

(Specific Example of Luminance Unevenness Correction)

Figure 23:
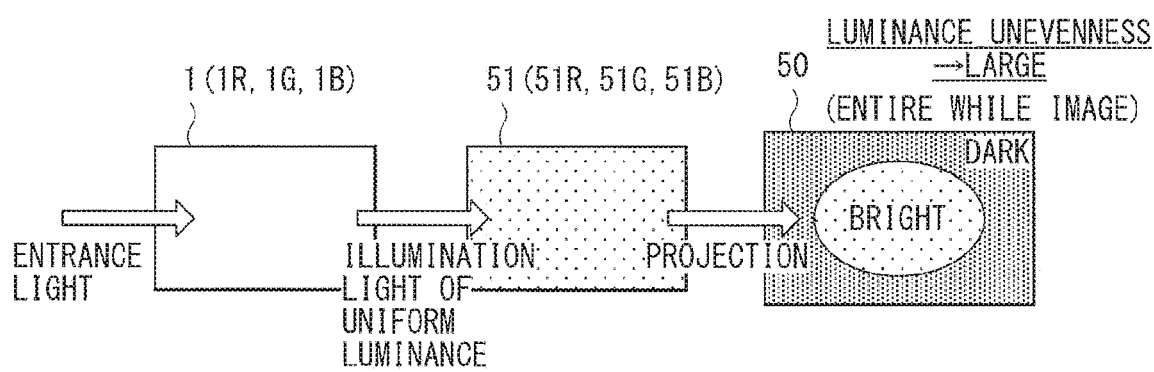
FIG. 23 is an illustrative diagram that illustrates an outline of the occurrence of luminance unevenness.
Figure 24:
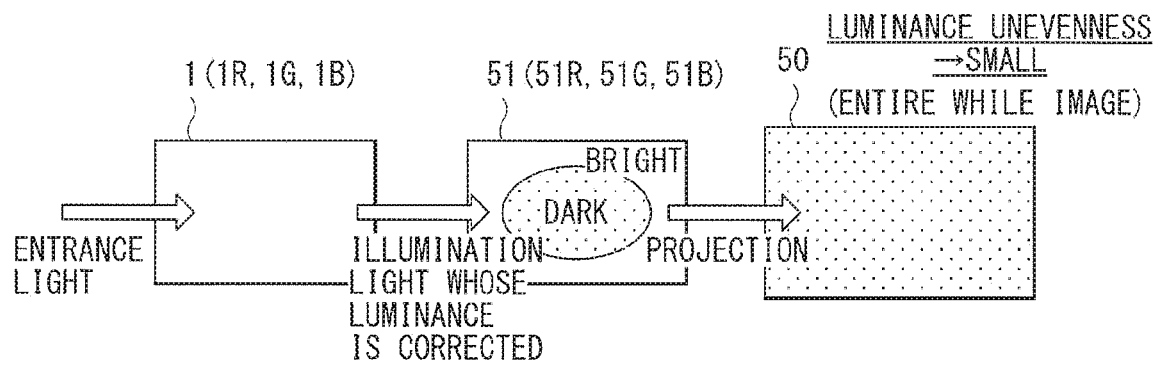
FIG. 24 is an illustrative diagram that illustrates an outline of the correction of luminance unevenness.

FIG. 23 illustrates an outline of the occurrence of luminance unevenness. FIG. 24 illustrates an outline of the correction of luminance unevenness.

For ease of description, a case where a single diffraction device 1 is used instead of the red diffraction device 1R, the green diffraction device 1G, and the blue diffraction device 1B will be described as an example. Further, a case where a single spatial light intensity modulation device 51 is used instead of the red spatial light intensity modulation device 51R, the green spatial light intensity modulation device 51G, and the blue spatial light intensity modulation device 51B will also be described as an example. The description will be given on the assumption that the projection lens 53 has a zoom function.

The projector 102 displays, for the measurement of luminance, for example, a white image in the entire effective display region. The diffraction device 1 forms a diffraction pattern so as to illuminate the entire effective display region of the spatial light intensity modulation device 51 with the illumination light of uniform luminance. The spatial light intensity modulation device 51 performs uniform intensity modulation on the entire effective display region so as to display the white image in the entire effective display region. In this way, ideally, on the screen 50, the white image is projected in the entire effective display region.

However, even when an attempt to display the ideal entire wuite image is made, luminance unevenness caused such as by the individual differences of the projection lens 53 or luminance unevenness on the screen 50 caused such as by unevenness in the illumination light profile of the diffraction device 1 or in the efficiency of diffraction of the diffraction device 1 may actually occur.

FIG. 23 illustrates an example where luminance unevenness occurs such that on the screen 50, a middle portion is bright and a peripheral portion is dark. The luminance unevenness in the projection image as described above is measured, for each of the colors, at each of the peak wavelengths with the luminance measurement unit 65.

The luminance unevenness correction calculation circuit 66 calculates, for each of the colors, on the basis of the result of the measurement of the luminance by the luminance measurement unit 65, the correction data for correcting luminance unevenness occurring in the projection image at each of the peak wavelengths. The diffraction pattern calculation circuit 62 calculates, for each of the colors, on the basis of the correction data and the image signal, the diffraction pattern that is optimized at a corresponding peak wavelength out of each of the peak wavelengths in the corresponding divided area 10. In this way, even when the image signal is a signal indicating the entire white image, the diffraction pattern calculation circuit 62 calculates a diffraction pattern so as to form not uniform illumination light but illumination light whose luminance distribution is corrected by the correction data. Thus, by contrast, for example, in a case where the luminance unevenness as illustrated in FIG. 23 occurs, within the effective display region of the spatial light intensity modulation device 51, as illustrated in FIG. 24, illumination light is applied whose luminance is corrected such that the middle portion is dark and that the peripheral portion is bright. The spatial light intensity modulation device 51 performs intensity modulation on the illumination light whose luminance is corrected. In this way, as a result, in the projection image on the screen 50, luminance unevenness is reduced.

[2.2 Effects]

In the present embodiment, even in a case where the projection lens 53 has the zoom function or the like and where the state of luminance unevenness is changed depending on the zoom magnification thereof or the like, it is possible to correct the luminance unevenness. For example, the data of luminance brightness in individual zoom conditions is acquired, and is fed back to the diffraction pattern displayed on the diffraction device 1, with the result that it is possible to reduce the luminance unevenness.

Moreover, in the present embodiment, it is also possible to reduce luminance unevenness caused by the shift of the oscillation wavelength of the light source resulting from usage conditions. For example, it is also possible to reduce luminance unevenness caused by the shift of the oscillation wavelength resulting from the chronological deterioration of the light source and the shift of the oscillation wavelength of the light source resulting from variations in environmental temperature or the like. In this case, a temperature detector or the like that detects the environmental temperature may be provided, and when the luminance unevenness correction calculation circuit 66 calculates the correction data, the result of the detection thereof may be reflected.

The other operations and effects may be substantially the same as those of the illuminator and the projector according to the first embodiment described above.

3. OTHER EMBODIMENTS

The technique of the present disclosure is not limited to the description of the individual embodiments described above, and various modification examples are possible.

For example, the present technology is also allowed to include configurations as described below.

(1)

An illuminator including:

a light source unit that emits at least one colored light, and emits, for each of the pieces of colored light, light having a plurality of peak wavelengths different from each other; and a diffraction device that includes a plurality of divided areas, and displays, in each of the divided areas, a diffraction pattern that is optimized at a corresponding peak wavelength out of each of the peak wavelengths, the plurality of divided areas allowing the light of the plurality of peak wavelengths to enter the plurality of divided areas individually for each of the pieces of colored light.

(2)

The illuminator according to (1), further including a light separation optical system that spatially separates, for each of the peak wavelengths, the light emitted from the light source unit.

(3)

The illuminator according to (1) or (2), in which the light source unit includes one or a plurality of light sources that emits one colored light, and emits, for the one colored light, the light having the plurality of peak wavelengths different from each other.

(4)

The illuminator according to (1) or (2), in which the light source unit emits the plurality of pieces of colored light in a time-division manner, and emits, for each of the plurality of pieces of colored light, the light having the plurality of peak wavelengths different from each other, and the diffraction device displays, in synchronization with timing at which the light source unit emits each of the pieces of colored light, the diffraction pattern for each of the pieces of colored light in the time-division manner.

(5)

The illuminator according to any one of (1) to (4), further including a diffraction pattern calculation circuit that calculates, on a basis of an image signal and for each of the pieces of colored light, the diffraction pattern of each of the peak wavelengths to be displayed on the diffraction device.

(6)

The illuminator according to (5), in which the diffraction pattern calculation circuit uses, for each of the pieces of colored light, fast Fourier transform to calculate the diffraction pattern of one of the plurality of peak wavelengths, and calculates the diffraction pattern of the peak wavelength other than the one of the peak wavelengths on a basis of the diffraction pattern of the one of the peak wavelengths.

(7)

The illuminator according to any one of (1) to (6), in which the plurality of divided areas is aligned in a horizontal direction and in a vertical direction.

(8)

The illuminator according to any one of (1) to (7), in which, for each of the pieces of colored light, areas of the plurality of divided areas differ from each other depending on the peak wavelength of light that enters the corresponding divided area.

(9)

The illuminator according to (8), in which the areas of the plurality of divided areas are each decreased as the peak wavelength of the light that enters the corresponding divided area is shortened.

(10)

A projector including:

an illuminator;

a light intensity modulation device that performs intensity modulation on illumination light from the illuminator to generate a projection image; and a projection optical system that projects, on a projection surface, the projection image generated by the light intensity modulation device, the illuminator including a light source unit that emits at least one colored light, and emits, for each of the pieces of colored light, light having a plurality of peak wavelengths different from each other, and a diffraction device that includes a plurality of divided areas, and displays, in each of the divided areas, a diffraction pattern that is optimized at a corresponding peak wavelength out of each of the peak wavelengths, the plurality of divided areas allowing the light of the plurality of peak wavelengths to enter the plurality of divided areas individually for each of the pieces of colored light.

(11)

The projector according to (10), further including a diffraction pattern calculation circuit that calculates, on a basis of an image signal and for each of the pieces of colored light, the diffraction pattern of each of the peak wavelengths to be displayed on the diffraction device.

(12)

The projector according to (11), further including:

a luminance measurement unit that measures, for each of the peak wavelengths, luminance of the projection image projected on the projection surface; and a luminance unevenness correction calculation circuit that calculates, on a basis of a result of the measurement of the luminance by the luminance measurement unit, correction data that corrects luminance unevenness occurring in the projection image, wherein the diffraction pattern calculation circuit calculates the diffraction pattern on a basis of the correction data and the image signal.

This application claims the benefit of Japanese Priority Patent Application JP2017-139991 filed with the Japan Patent Office on Jul. 19, 2017, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projector, comprising:
an illuminator;
a light intensity modulation device that performs intensity modulation on illumination light from the illuminator to generate a projection image; and
a projection optical system that projects, on a projection surface, the projection image generated by the light intensity modulation device,
the illuminator including
a light source unit that emits light of at least a first color, wherein the light of the first color includes a plurality of peak wavelengths that are different from each other, and
a diffraction device that includes a plurality of divided areas, wherein the diffraction device displays, in each of the divided areas, a different diffraction pattern, wherein the different diffraction patterns are optimized for a different corresponding peak wavelength out of each of the peak wavelengths included in the light of the first color emitted by the light source unit, wherein each divided area in the plurality of divided areas receives light at the corresponding peak wavelength out of the plurality of peak wavelengths for which the diffraction pattern is optimized, and wherein an area of a first one of the divided areas receiving a longest one of the peak wavelengths of the plurality of peak wavelengths is larger than an area of a second one of the divided areas receiving a shortest one of the peak wavelengths of the plurality of peak wavelengths.

2. The projector according to claim 1, wherein the light source unit emits light of a plurality of different colors, the projector further comprising a diffraction pattern calculation circuit that calculates, on a basis of an image signal and for each of the different colors of light emitted by the light source unit, the diffraction pattern for each of the peak wavelengths included in each different color of light to be displayed on the diffraction device.

3. The projector according to claim 2, further comprising:
a luminance measurement unit that measures, for each of the peak wavelengths, luminance of the projection image projected on the projection surface; and
a luminance unevenness correction calculation circuit that calculates, on a basis of a result of the measurement of the luminance by the luminance measurement unit, correction data that corrects luminance unevenness occurring in the projection image,
wherein the diffraction pattern calculation circuit calculates the diffraction pattern on a basis of the correction data and the image signal.

4. The projector according to claim 1, wherein the peak wavelengths of the light of the first color are separated from one another by no more than three nanometers.

5. An illuminator, comprising:
a light source unit that emits light of at least a first color, wherein the light of the first color includes a plurality of peak wavelengths that are different from each other; and
a diffraction device that includes a plurality of divided areas, wherein the diffraction device displays, in each of the divided areas, a different diffraction pattern, wherein the different diffraction patterns are optimized for a different corresponding peak wavelength out of each of the plurality of peak wavelengths included in the light of the first color emitted by the light source unit, wherein each divided area in the plurality of divided areas receives light at the corresponding peak wavelength out of the plurality of peak wavelengths for which the diffraction pattern is optimized, and wherein an area of a first one of the divided areas receiving a longest one of the peak wavelengths of the plurality of peak wavelengths is larger than an area of a second one of the divided areas receiving a shortest one of the peak wavelengths of the plurality of peak wavelengths.

6. The illuminator according to claim 5, further comprising a light separation optical system that spatially separates, for each of the peak wavelengths, the light emitted from the light source unit.

7. The illuminator according to claim 5, wherein the light source unit
includes one or a plurality of light sources that emits light of at least the first color, and
emits, for the light of the at least a first color, the light having the plurality of peak wavelengths that are different from each other.

8. The illuminator according to claim 5, wherein
the light source unit emits light of a plurality of colors in a time-division manner, and emits, for each of the plurality of colors, light of one of the colors and having a plurality of peak wavelengths different from each other, and
the diffraction device displays, in synchronization with a timing at which the light source unit emits each of the plurality of colors, different diffraction patterns for each of the different peak wavelengths of each of the plurality of colors in the time-division manner.

9. The illuminator according to claim 5, further comprising a diffraction pattern calculation circuit that calculates, on a basis of an image signal and for each of a plurality of colors emitted by the light source unit, the diffraction pattern of each of the peak wavelengths to be displayed on the diffraction device.

10. The illuminator according to claim 9, wherein the diffraction pattern calculation circuit uses, for each of the plurality of colors emitted by the light source unit, fast Fourier transform to calculate the diffraction pattern of one of the plurality of peak wavelengths, and calculates the diffraction pattern of the peak wavelength other than the one of the peak wavelengths on a basis of the diffraction pattern of the one of the peak wavelengths.

11. The illuminator according to claim 5, wherein the plurality of divided areas is aligned in a horizontal direction and in a vertical direction.

12. The illuminator according to claim 5, wherein, for each of a plurality of colors emitted by the light source unit, areas of the plurality of divided areas differ from each other depending on the peak wavelength of light that enters the corresponding divided area.

13. The illuminator according to claim 12, wherein the areas of the plurality of divided areas are each decreased as the peak wavelength of the light that enters the corresponding divided area is shortened.

14. The illuminator according to claim 5, wherein the peak wavelengths of the light of the first color are separated from one another by no more than three nanometers.

15. An illuminator, comprising:
a light source unit that emits light of at least a first color, wherein the light of the first color includes a plurality of peak wavelengths that are different from each other; and
a diffraction device that includes a plurality of divided areas, wherein the diffraction device displays, in each of the divided areas, a different diffraction pattern, wherein the different diffraction patterns are optimized for a different corresponding peak wavelength out of each of the plurality of peak wavelengths included in the light of the first color emitted by the light source unit, wherein each divided area in the plurality of divided areas receives light at the corresponding peak wavelength out of the plurality of peak wavelengths for which the diffraction pattern is optimized, and wherein each divided area of the diffraction device receives the peak wavelength of the light of the first color for which the divided area is optimized simultaneously.

16. The illuminator according to claim 15, further comprising a light separation optical system that spatially separates, for each of the peak wavelengths, the light emitted from the light source unit.

17. The illuminator according to claim 15, wherein the light source unit
- includes one or a plurality of light sources that emits light of at least the first color, and
- emits, for the light of the at least a first color, the light having the plurality of peak wavelengths that are different from each other.

18. The illuminator according to claim 15, wherein
the light source unit emits light of a plurality of colors in a time-division manner, and emits, for each of the plurality of colors, light of one of the colors and having a plurality of peak wavelengths different from each other, and
the diffraction device displays, in synchronization with a timing at which the light source unit emits each of the plurality of colors, different diffraction patterns for each of the different peak wavelengths of each of the plurality of colors in the time-division manner.

19. The illuminator according to claim 15, further comprising a diffraction pattern calculation circuit that calculates, on a basis of an image signal and for each of a plurality of colors emitted by the light source unit, the diffraction pattern of each of the peak wavelengths to be displayed on the diffraction device.

20. The illuminator according to claim 19, wherein the diffraction pattern calculation circuit uses, for each of the plurality of colors emitted by the light source unit, fast Fourier transform to calculate the diffraction pattern of one of the plurality of peak wavelengths, and calculates the diffraction pattern of the peak wavelength other than the one of the peak wavelengths on a basis of the diffraction pattern of the one of the peak wavelengths.

* * * * *